US007529563B1

(12) United States Patent  
Pitroda

(10) Patent No.: US 7,529,563 B1  
(45) Date of Patent: May 5, 2009

(54) SYSTEM FOR DISTRIBUTION AND USE OF VIRTUAL STORED VALUE CARDS

(76) Inventor: Satyan G. Pitroda, 301 Trinity La., Oakbrook, IL (US) 60523

( * ) Notice: Subject to any disclaimer, the term of this patent is extended or adjusted under 35 U.S.C. 154(b) by 791 days.

(21) Appl. No.: 09/612,789

(22) Filed: Jul. 10, 2000

(51) Int. Cl.
*H04B 1/38* (2006.01)

(52) U.S. Cl. .................. 455/558; 455/406; 455/410; 455/414.1; 455/80

(58) Field of Classification Search ......... 455/406–408, 455/558, 414, 551, 64, 35, 41, 67, 39, 34, 455/17, 44, 80, 405, 414.1, 557; 705/64, 705/41, 67, 39, 34, 17, 1, 44, 35, 65

See application file for complete search history.

(56) References Cited

U.S. PATENT DOCUMENTS

| | | | |
|---|---|---|---|
| RE28,081 E | 7/1974 | Travioli | 235/61.11 E |
| 4,305,059 A | 12/1981 | Benton | 340/825.33 |
| 4,341,951 A | 7/1982 | Benton | 235/379 |
| 4,454,414 A | 6/1984 | Benton | 235/379 |
| 4,491,725 A | 1/1985 | Pritchard | 364/408 |
| 4,523,087 A | 6/1985 | Benton | 235/379 |
| 4,575,621 A | 3/1986 | Dreifus | 235/380 |
| 4,634,845 A | 1/1987 | Hale et al. | 235/350 |
| 4,650,981 A | 3/1987 | Foletta | 235/449 |
| 4,689,478 A | 8/1987 | Hale et al. | 235/380 |
| 4,692,601 A | 9/1987 | Nakano | 235/380 |
| 4,705,211 A | 11/1987 | Honda et al. | 235/380 |
| 4,739,295 A | 4/1988 | Hayashi et al. | 235/492 |
| 4,799,156 A | 1/1989 | Shavit et al. | 364/401 |
| 4,833,595 A | 5/1989 | Iijima | 364/200 |
| 4,837,422 A | 6/1989 | Detloff et al. | 235/380 |
| 4,849,613 A | 7/1989 | Eisele | 235/379 |

(Continued)

FOREIGN PATENT DOCUMENTS

CA      2295043      1/1999

(Continued)

OTHER PUBLICATIONS

PCT International Search Report, Intl. Appln. No. PCT/US01/23899, Intl. Filing Date: Jul. 30, 2001, cited on p. 3, the above-listed U.S. Appl. Nos. 5,828,740, 6,105,008 and 6,185,545 B1. (3 pages).*

(Continued)

*Primary Examiner*—Tan Trinh  
(74) *Attorney, Agent, or Firm*—Husch Blackwell Sanders LLP Welsh & Katz

(57) ABSTRACT

A method of exchanging payment information in an electronic transaction includes a first electronic transaction device transferring payment information to a second electronic transaction device, the second electronic transaction device transferring value information to the first electronic transaction device, and the second electronic transaction device transferring value information and payment information to a service consolidation center. A retailer electronic transaction device may transfer a virtual stored value card to a customer's electronic transaction device.

A method of tracking retail sales of pre-paid telephone cards to cash subscribers includes entering value purchased information and subscriber information in a retailer electronic transaction device, the retailer electronic transaction device transferring the value purchased information and subscriber information to a mobile operator, and the mobile operator adding value corresponding to the value purchased information to an account corresponding to the subscriber information.

12 Claims, 23 Drawing Sheets

U.S. PATENT DOCUMENTS

| | | | | |
|---|---|---|---|---|
| 4,849,614 | A | | 7/1989 | Watanabe et al. ............ 235/380 |
| 4,858,121 | A | | 8/1989 | Barber et al. ................. 364/406 |
| 4,891,506 | A | | 1/1990 | Yoshimatsu ................. 235/492 |
| 4,910,774 | A | | 3/1990 | Barakat ......................... 380/30 |
| 4,910,775 | A | | 3/1990 | Yves et al. ..................... 380/25 |
| 4,918,631 | A | | 4/1990 | Hara et al. ................... 364/708 |
| 4,928,001 | A | | 5/1990 | Masada ....................... 235/492 |
| 4,973,828 | A | | 11/1990 | Naruse et al. ................ 235/380 |
| 4,983,816 | A | | 1/1991 | Iijima .......................... 235/379 |
| 5,015,830 | A | | 5/1991 | Masuzawa et al. ........... 235/441 |
| 5,017,766 | A | | 5/1991 | Tamada et al. ............... 235/492 |
| 5,023,908 | A | | 6/1991 | Weiss ........................... 380/23 |
| 5,055,662 | A | | 10/1991 | Hasegawa .................... 235/492 |
| 5,055,968 | A | | 10/1991 | Nishi et al. .................. 361/395 |
| 5,068,521 | A | | 11/1991 | Yamaguchi .................. 235/492 |
| 5,150,420 | A | | 9/1992 | Haraguchi ................... 235/380 |
| 5,153,842 | A | | 10/1992 | Dlugos, Sr. et al. .......... 235/380 |
| 5,157,247 | A | | 10/1992 | Takahira ..................... 235/492 |
| 5,168,151 | A | | 12/1992 | Nara ........................... 235/492 |
| 5,189,287 | A | | 2/1993 | Parienti ....................... 235/375 |
| 5,218,188 | A | | 6/1993 | Hanson ....................... 235/375 |
| 5,247,575 | A | * | 9/1993 | Sprague et al. ............... 705/53 |
| 5,276,311 | A | | 1/1994 | Hennige ...................... 235/492 |
| 5,301,105 | A | | 4/1994 | Cummings, Jr. ............. 364/401 |
| 5,479,494 | A | * | 12/1995 | Clitherow ............... 379/114.15 |
| 5,497,411 | A | * | 3/1996 | Pellerin ........................ 455/411 |
| 5,526,409 | A | * | 6/1996 | Conrow et al. ........... 379/91.02 |
| 5,590,038 | A | | 12/1996 | Pitroda ........................ 395/241 |
| 5,715,314 | A | | 2/1998 | Payne et al. ................... 380/24 |
| 5,717,923 | A | | 2/1998 | Dedrick ....................... 395/613 |
| 5,828,740 | A | * | 10/1998 | Khuc et al. ................... 379/144 |
| 5,842,178 | A | | 11/1998 | Giovannoli ................... 705/26 |
| 5,852,809 | A | | 12/1998 | Abel et al. ..................... 705/26 |
| 5,884,271 | A | | 3/1999 | Pitroda ........................... 705/1 |
| 5,887,266 | A | * | 3/1999 | Heinonen et al. ............ 455/558 |
| 5,899,980 | A | | 5/1999 | Wilf et al. ..................... 705/26 |
| 5,903,633 | A | | 5/1999 | Lorsch | |
| 5,915,007 | A | * | 6/1999 | Klapka .................. 379/114.18 |
| 5,987,325 | A | * | 11/1999 | Tayloe ......................... 455/435 |
| 5,991,413 | A | * | 11/1999 | Arditti et al. .................. 705/77 |
| 6,101,378 | A | * | 8/2000 | Barabash et al. ............. 455/406 |
| 6,105,008 | A | * | 8/2000 | Davis et al. .................... 705/41 |
| 6,115,601 | A | * | 9/2000 | Ferreira ....................... 455/406 |
| 6,128,509 | A | * | 10/2000 | Veijola et al. ................ 455/556 |
| 6,167,251 | A | * | 12/2000 | Segal et al. .................. 455/406 |
| 6,169,890 | B1 | * | 1/2001 | Vatanen ....................... 455/406 |
| 6,169,975 | B1 | * | 1/2001 | White et al. ................... 705/44 |
| 6,185,545 | B1 | * | 2/2001 | Resnick et al. ................ 705/40 |
| 6,202,155 | B1 | * | 3/2001 | Tushie et al. ................. 713/200 |
| 6,208,851 | B1 | | 3/2001 | Hanson | |
| 6,257,486 | B1 | * | 7/2001 | Teicher et al. ............... 235/380 |
| 6,311,171 | B1 | | 10/2001 | Dent ............................ 705/64 |
| 6,356,752 | B1 | * | 3/2002 | Griffith ....................... 455/406 |
| 6,386,457 | B1 | * | 5/2002 | Sorie ........................... 235/487 |
| 6,402,028 | B1 | * | 6/2002 | Graham et al. ............... 235/380 |
| 6,415,156 | B1 | * | 7/2002 | Stadelmann ................. 455/466 |
| 6,424,706 | B1 | * | 7/2002 | Katz et al. ............... 379/144.01 |
| 6,424,845 | B1 | * | 7/2002 | Emmoft et al. .............. 455/575 |
| 6,430,407 | B1 | * | 8/2002 | Turtiainen ................... 455/411 |
| 6,434,379 | B1 | * | 8/2002 | Despres et al. ............... 455/406 |
| 6,442,532 | B1 | * | 8/2002 | Kawan ......................... 705/35 |
| 6,466,783 | B2 | * | 10/2002 | Dahm et al. ................. 455/414 |
| 6,467,684 | B2 | * | 10/2002 | Fite et al. ..................... 235/379 |
| 6,535,726 | B1 | * | 3/2003 | Johnson ...................... 455/406 |
| 6,769,607 | B1 | * | 8/2004 | Pitroda et al. ................ 235/380 |
| 6,880,084 | B1 | * | 4/2005 | Brittenham et al. .......... 713/173 |
| 2001/0001321 | A1 | * | 5/2001 | Resnick et al. ................ 705/17 |
| 2001/0005840 | A1 | * | 6/2001 | Verkama ...................... 705/67 |
| 2001/0021648 | A1 | * | 9/2001 | Fougnies et al. ............. 455/408 |
| 2001/0023402 | A1 | * | 9/2001 | Flynn ............................ 705/1 |
| 2001/0032878 | A1 | * | 10/2001 | Tsiounis et al. .............. 235/379 |
| 2002/0004783 | A1 | * | 1/2002 | Patlenghe et al. ............. 705/41 |
| 2002/0016740 | A1 | * | 2/2002 | Ogasawara ................... 705/26 |
| 2002/0029189 | A1 | * | 3/2002 | Titus et al. .................... 705/39 |
| 2003/0028458 | A1 | * | 2/2003 | Gaillard ....................... 705/35 |
| 2003/0069816 | A1 | * | 4/2003 | Ung et al. ..................... 705/34 |
| 2003/0069874 | A1 | * | 4/2003 | Hertzog et al. ................. 707/1 |
| 2003/0083042 | A1 | * | 5/2003 | Abuhamdeh ................ 455/406 |
| 2003/0130940 | A1 | * | 7/2003 | Hansen et al. ................ 705/39 |
| 2003/0145333 | A1 | * | 7/2003 | Hjelsvold et al. ............ 725/113 |
| 2003/0222135 | A1 | * | 12/2003 | Stoutenburg et al. ........ 235/379 |
| 2004/0249726 | A1 | * | 12/2004 | Linehan ...................... 705/26 |
| 2008/0033870 | A9 | * | 2/2008 | Gutierrez-Sheris ........... 705/39 |

FOREIGN PATENT DOCUMENTS

| | | |
|---|---|---|
| EP | 1111561 | 6/2001 |
| GB | 2255934 A | 11/1992 |
| GB | 2 339 625 A | 2/2000 |
| WO | WO 98/47112 | 10/1998 |
| WO | WO 01/09853 | 2/2001 |
| WO | WO 01/11857 | 2/2001 |
| WO | WO 01/37200 | 5/2001 |
| WO | WO 01/46920 | 6/2001 |

OTHER PUBLICATIONS

Sprint Priority Gold$^{SM}$ Newsletter, Mar. 11, 1994,—"the Voice F NCARD$^{SM}$" 1994 Spring Communications Co. L.P.(2 pgs).

PC Magazine—Mar. 29, 1994, Trends, Trends & Technology Shaping the Personal Computer Market, "The PC in Your Wallet", publication (1 page).

Business Life Magazine, Dec./Jan. 1994/1995, "The Era of the Smart Card", publication (4 pages).

Mondex Magazine—The World of Mondex Global Electronic Cash, Summer 1996, "What's up doc?—The smart way to pay for infotainment", publication (3 pages).

"SmartTV tm", Mar. 1, 1997 (four pages plus cover page).

CyberCash Microsoft CPC Wallet, Aug. 3, 1999—"What is the Microsoft Wallet?"—Internet publication (2 pages)—http://www.cybercash.com/ms/coincpc/description.html.

Ilium Software's eWallet—"eWallet™" All your Important Information Secure, Convenient, Centralized Handheld, Palmsize and Desktop PCs—Jul. 26, 1999, Internet publication (3 pages)—http://www.iliumsoft.com/wallet.htm.

Ilium Software's KeepTrack for Windows CE—"Keep Track"—Version 2.0: Many New Features Credit, Debit, ATM card transactions—Handheld, Palmsize and Desktop PCs, Jul. 26, 1999 Internet publication (3 pages)—http://www.iliumsoft.com/keeptrk.htm.

Ilium Software: Handheld Software for Windows CE—"Ilium Software—Simple Software for a Simpler Life", Jul. 26, 1999, Internet Publication (4 pages)- http://www.iliumsoft.com/about.htm.

Ilium Software Products—Product Information—Jul. 26, 1999, Internet publication (2 pages)—http://www.iliumsoft.com/products.htm.

Q*Wallet—Electronic Wallet for Windows 95/98/NT—"Q*Wallet Home", Jul. 26, 1999, Internet publication (2 pages)—http://www.qwallet.com/index.shtml.

Q*Wallet Screenshots—Electronic Wallet for Windows 95/98/NT—"Q*Wallet Screenshots", Jul. 26, 1999, Internet publication (3 pages)—http://www.qwallet.com/screens.shtml.

Welcome To EntryPoint—"Welcome to entrypoint!"—"PointCast+Ewallet=entrypoint™", Sep. 22, 1999, Internet publication (15 pages)—http://www.entrypoint.com/.

Palm Wars—"3COM tries to solve its palm problem"—"The creators of the Palm launch a new device, and 3Com fights back" by Daniel Roth. Fortune, pp. 111-112, Oct. 11, 1999 (2 pgs.).

Nokia—"Next Up for Cell Phones: Weaving A Wireless Web" by Janet Guyon. Fortune, pp. 61-66, Oct. 25, 1999 (6 pages).

"*Undated Brochure*—Geneva—nOw" -Hewlett Packard—Tribune De Geneve, (2 pages).

Toshiba—Mobile Multimedia—"TEGACKY PM-T101—Touch-Pen Entry PHS Phone"—(1 pg.).

*Publiation Unknown*—Technology—"Small is Beautiful"—(3 pages).

Mar. 18, 2008, "Summons to attend oral proceedings pursuant to Rule 115(1) EPC" correspondence received from the European Patent Office-Examining Division in regard to a corresponding EP Application No. 01961796.8, for C-Sam, Inc. (9 pgs).

* cited by examiner

"Virtual Card" Generation & Download

A

B

SYSTEM FOR DISTRIBUTION AND USE OF VIRTUAL STORED VALUE CARDS

BACKGROUND OF THE INVENTION

This invention relates to a new and improved system for distribution and use of virtual stored value cards. One particular example where the invention may be used is in pre-paid virtual cards for mobile voice and data services.

Wireless or mobile phone operators typically have post-pay and pre-paid subscribers for their voice & data services. Post-pay subscribers pay for airtime they use at the end of a billing period, typically at a pre-determined rate, once a month. Pre-paid subscribers, in contrast pay for a pre-set amount of airtime, at a pre-determined rate, before they start using the airtime purchased. Pre-paid subscribers essentially create a stored-value account, from which they can use the minutes that they have purchased. The mobile operator's system keeps track of the minutes purchased and subsequently used by pre-paid subscribers and prompts them as their stored-value amounts near depletion. At this point pre-paid subscribers have the option to replenish their airtime. The operation of adding more minutes of airtime to an existing pre-paid account is typically referred to as the "top-up" or "top-off" operation.

Pre-paid services are one of the fastest growing segments of the mobile telephone operator business (mobile operators or MO). Pre-paid customers require no credit, no deposits, no contracts, no account fee, no age limit, but simply a periodic top up. Pre-paid customers do not need to demonstrate established credit or provide any details to mobile operators.

As the cost of mobile handsets and associated infrastructure has steadily decreased over time, many markets have seen an exponential increase in mobile users. As the current trend continues, the number of mobile installations may outgrow existing landlines. As the mobile handsets improve (hardware—processing power and memory, software, display—size and resolution, form factor, battery life, etc.) and the bandwidth offered by the mobile operator's increase, the new services offered by mobile operators will increase substantially. Because of decreasing costs of the handsets and the potential of value added services, mobile operators have been able to subsidize handset costs and offer pre-paid services to a large number of new customers to increase market share substantially. In some markets pre-paid customers account for as much as 70 to 80% of the total customer base. The pre-paid services have become popular for several reasons.

Pre-paid subscribers do not have to deal with long-term contracts—an element typical to a lot of calling plans offered by mobile operators to essentially allow them to subsidize the cost of the mobile handset. As the cost of handsets has continued to drop, and also as handset churn rates continue to climb, subscribers have the opportunity of purchasing secondhand devices, further increasing the number of overall wireless subscribers. Owing to these factors, the mobile operators can now afford to offer pre-paid calling plans without any rigorous long-term contracts.

Since pre-paid calling plans do not require the subscriber to pay the charges at the end of the billing cycle, cash starved subscribers do not have to set aside any funds. This allows the subscriber to purchase service, without any elaborate budgeting.

Pre-paid subscribers do not have to deal with any unused airtime on fixed plans. For instance, typical plans will have a preset number of minutes of airtime for a certain value, which would expire at the end of the month. If these minutes are not used, they expire and the subscriber loses the value associated with the unused airtime.

Pre-paid subscribers do not require a credit account, or in many cases even a bank account, allowing them to purchase the service over the counter using cash, at various retail outlets and mobile operator certified distribution centers in the form of "scratch-off" plastic cards. This is ideal for the lower and middle income groups, students, and also for pre-dominantly cash economies, in emerging markets, where the pre-paid product has been very successful.

Mobile Operators ("MO") typically distribute their handsets (or alternately SIM cards) to pre-paid subscribers through controlled distribution channels—certified distribution outlets and/or participating retailers. The handsets come with some airtime preinstalled, as an incentive to the subscriber, and also allowing them to call the mobile operator to setup and "top-up" an account. The top-up operation to replenish airtime for pre-paid accounts may be accomplished in one of the following ways (FIG. 1 and FIG. 2):

The subscriber may top-up a pre-paid account by dialing into the MO's system, using their established payment account—credit, debit, etc. This may be done manually by speaking to a MO customer service representative, by using an automated voice activated response ("VAR") system, or through the Internet.

To manually top-up a pre-paid account, the subscriber calls an MO customer service representative, reads the pre-paid account number, and states the additional airtime required and the preferred payment method, which involves reading the credit card account number, expiry date, etc. This typically involves a dedicated session between the subscriber and the customer service representative, which is cumbersome, labor intensive and expensive.

In contrast, the automated VAR procedure involves dialing into the MO's system, selecting the number of minutes or airtime required, and entering or setting up a payment account, typically using the MO's automated voice activated response 110 system.

One of the channels for top-up is through the Internet. Pre-paid subscribers may top-up their accounts by connecting to the mobile operator's pre-paid system through the Internet, entering a password to access their account and top-up using a credit account.

In addition, a subscriber may setup a new pre-paid account, or alternately top-up an existing account by going to a MO certified distribution center. These distribution centers may either be a retail environment, or possibly a certified bank that allows the subscribers to top-up their accounts using their ATM infrastructure or bank checks.

One of the more popular methods of top-up, especially for people who do not have a credit card or bank account or established credit and want to use just cash, requires purchasing a plastic card with a code for cash, which typically would be scratched off by the purchaser. These cards are distributed at the retail establishment—grocery stores, gas stations, etc.—in various denominations such as $10, $20, $50, $100, etc., where the subscriber would purchase a plastic card for the amount of required airtime. This plastic card is distributed in a tamper proof package, and is purchased from a retailer. The subscriber then scratches off the code, enters this code manually through the mobile handset into the MO's system, which in turn replenishes the amount of airtime purchased by the subscriber.

There are several disadvantages to present methods of topping-off pre-paid accounts. The mobile operators' cost for offering pre-paid airtime is as high as 20-30%. These costs are essentially incurred at various levels, for printing, packaging and distributing the cards, commissions for various intermediaries, depending on the distribution channel and process adopted. The manual system incurs additional labor costs, since it requires a dedicated customer service representative to walk the subscriber through the entire setup and top-up process. Add to this, the credit card issuer's fees for the transaction ("Card Holder Not Present" (CHNP) transactions), and the overall cost incurred by the mobile operator to support this distribution channel is very high.

The automated VAR channel may reduce a fraction of the cost by removing the labor component from the manual system. But this process has proven to be extremely cumbersome. Topping-up the account from the mobile device handset is awkward for the user, given the state of the handset's form factor, user interface, screen and keypad sizes. Thus, errors occur, especially during the setup operation, when the user must alternatively hold the handset near the ear to hear the VAR system and then hold it in front of the eyes to dial appropriate numbers. This eventually drives impatient subscribers to less cumbersome distribution channels, which in turn have a higher cost associated to the model for the mobile operator.

Certified MO distributors typically provide over-the-counter service for pre-paid subscribers, which incurs retail costs, in addition to the costs mention above. Because there are only a limited number of certified centers, the overall reach of such distribution centers is limited. Since many of these certified centers have a direct hook-up into the MO's back-end system, adding on such centers require more direct hook-ups, increasing the potential of fraud and adds to the accounting and inventory management costs.

Neutral distributors who support several mobile operators' products, typically charge a high margin for shelf space, increasing the distribution cost for the mobile operator.

One of the most popular channels of distribution for pre-paid products is through existing retail distribution channels—gas stations, grocery and department stores, etc. The reach of these channels, along with the ability to use cash, are the top most reasons for its popularity, but are also the most expensive for the mobile operator to support.

The mobile operator incurs some cost for producing the plastic cards, packaging and distributing them. In addition, the mobile operator incurs costs for tracking and managing physical inventory, ironically for a non-physical or virtual product such as airtime.

Retailers charge the mobile operators a very high margin for the distribution of these plastic cards, as they take up expensive shelf space. These margins form one of the integral components of the overall costs incurred by the mobile operator for the distribution of plastic pre-paid cards. Cash handling expenses, and credit card fees add to the overall cost, along with other cost elements typical to a retail environment.

Regarding transactions in general, the cost of a transaction, in the existing credit or debit environments supported by the widely accepted banking networks, typically ranges between 1.2 to 5.0% of the transaction, plus an additional 10 to 35 cents. The cost these transactions renders existing credit and debit transaction systems impractical for "sub to single digit dollar" transactions, typically referred to as micro-payments. Many transactions, especially proximity transactions for applications such as vending machines, toll, parking and transit, fall under this category which could be well supported by a stored cash value payment system.

The current stored value payment systems are inefficient, due to the lack of interoperability across payment worlds and end to end security. Consequently, the existing stored value payment systems have not been able to successfully cater to the eCommerce and mCommerce environments. In the brick and mortar retail environment, again the lack of a truly global interoperable and secure system has been responsible for less acceptance by merchants and consequently less penetration among users. The existing systems have also failed to provide an effective payment system for minors, who typically do not qualify for a credit or debit card, for credit challenged individuals and for person to person transactions.

Because existing credit and debit transaction systems are impractical for micropayments, cash is the predominant form of payment. Cash may be cumbersome, subject to theft or loss, and in some cases owing to the lack of local currency, impractical and extremely inconvenient. In terms of the merchants, owing to the high potential of fraud and theft, cash transactions are associated with a very high cost of handling and collection. Thus need exists for a suitable payment system to address the above outlined issues, and at the same time reduce cash transactions for the convenience of the users and merchants alike.

DETAILED DESCRIPTION OF A PREFERRED EMBODIMENT

Figure 1:
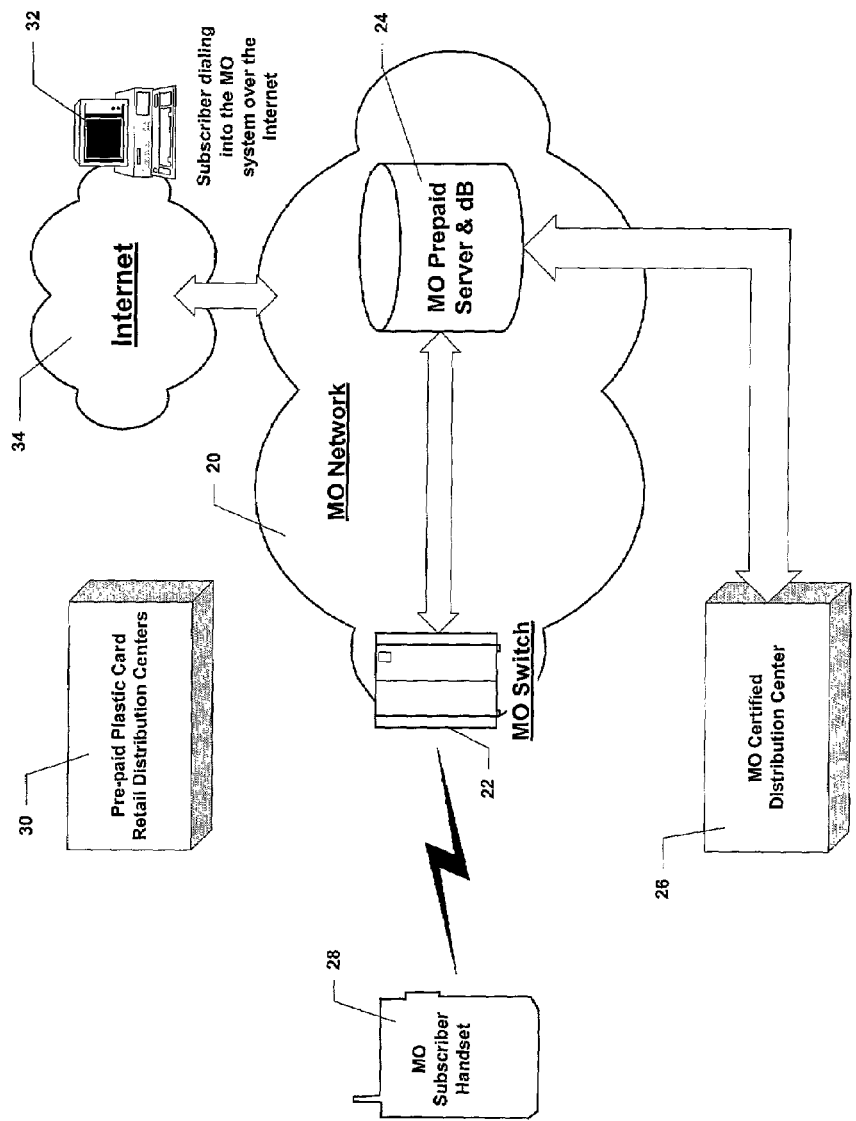
FIG. 1 is a diagram of a prior-art pre-paid distribution system.
Figure 2:
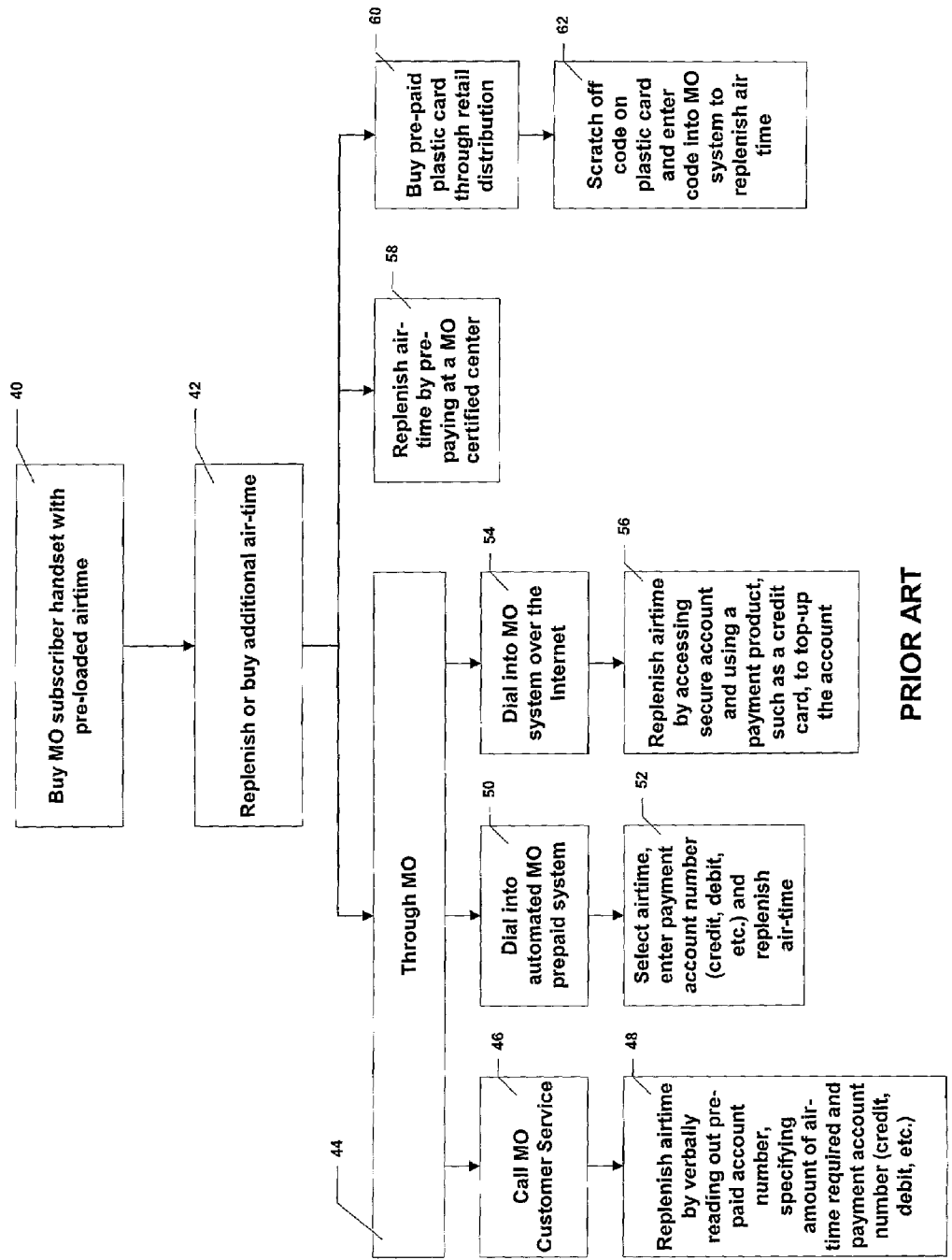
FIG. 2 is a flow chart of a prior art pre-paid distribution system.

For purposes of reference, FIGS. 1 and 2 are diagrams that generally depict various aspects of prior art distribution of pre-paid air time. FIG. 1 shows existing channels of distribution for pre-paid airtime, the setup and top-up operations using a mobile handset and the mobile operator's manual or automated systems, using the mobile operator certified locations and the retail outlet model to procure plastic pre-paid "scratch-off cards."

FIG. 2 is a flowchart depicting current distribution processes for a mobile handset with pre-paid airtime.

As shown in FIG. 1, MO Network 20 includes MO Switch 22 and MO Pre-paid Server and Database 24. MO Certified Distribution Center 26 is coupled to the MO Pre-paid Server and Database 24. MO Subscriber Handset 28 is in electronic communication with MO Switch 22. Pre-paid Plastic Card Retail Distribution Centers 30 are not connected to the MO Network 20. MO Subscribers may connect to the MO Network 20 by way of a Computer 32 connected to the Internet 34.

Figure 3:
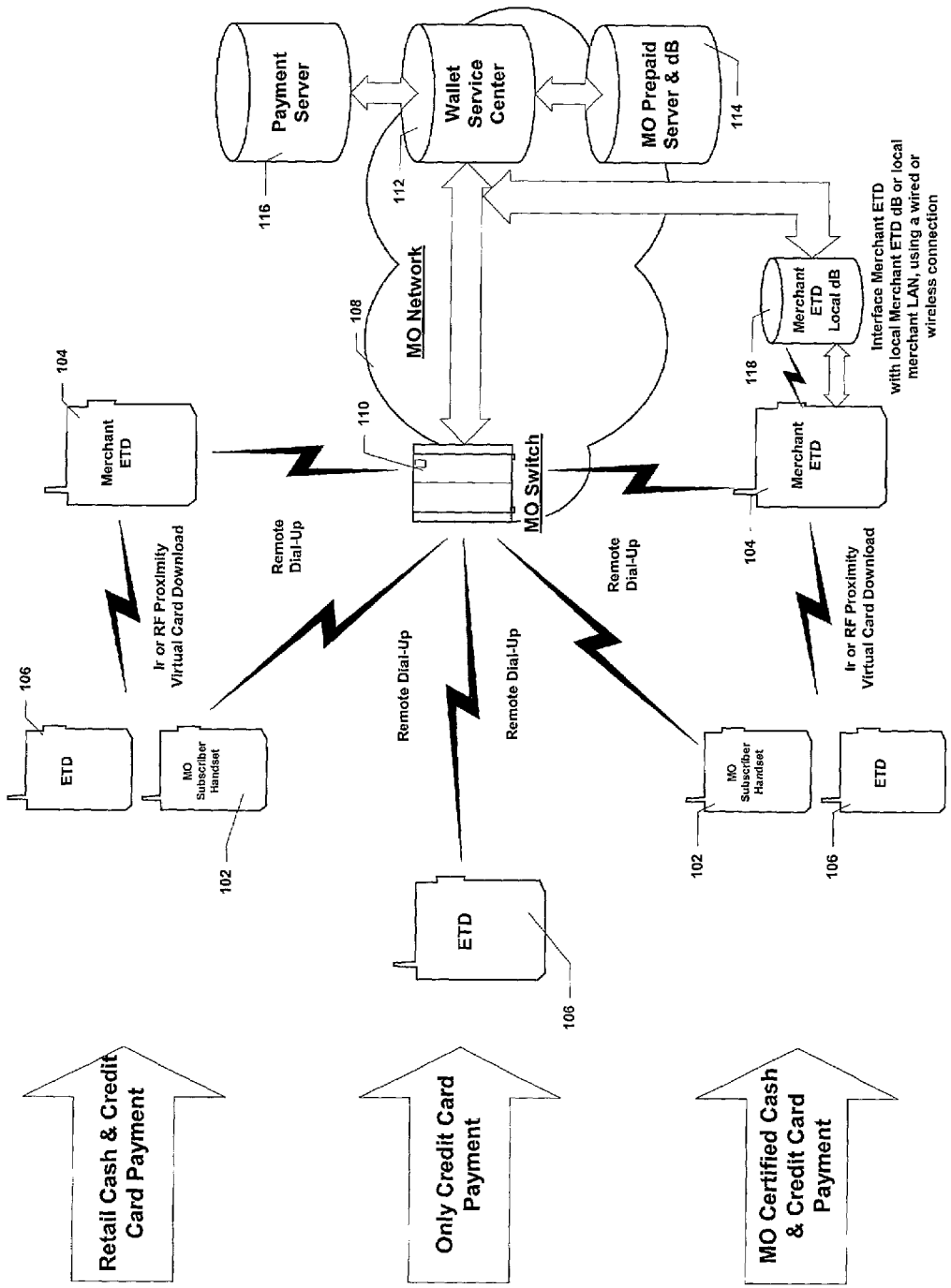
FIG. 3 is a diagram depicting a preferred embodiments of the electronic pre-paid distribution system of the present invention.
Figure 12:
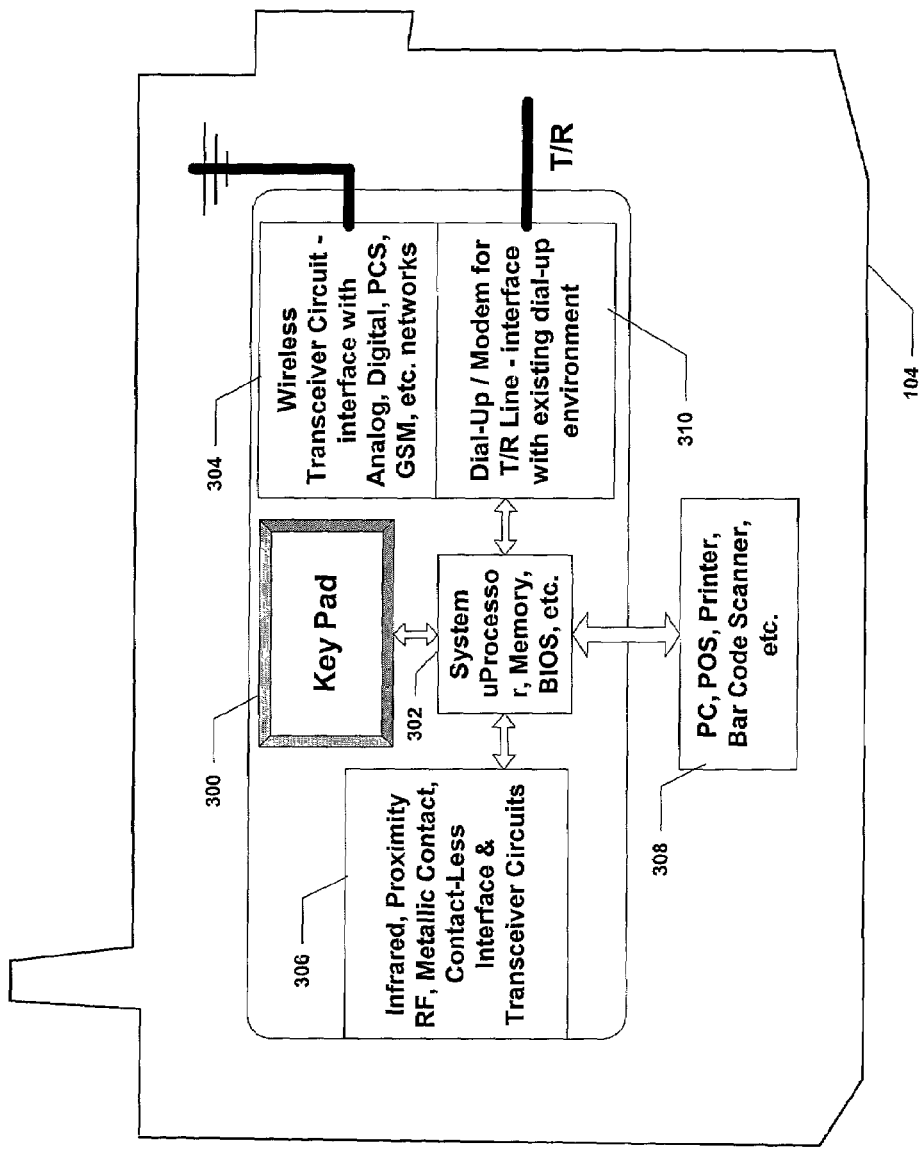
FIG. 12 is a diagram depicting a preferred embodiment of the Merchant Wallet Architecture of the present invention.
Figure 13:
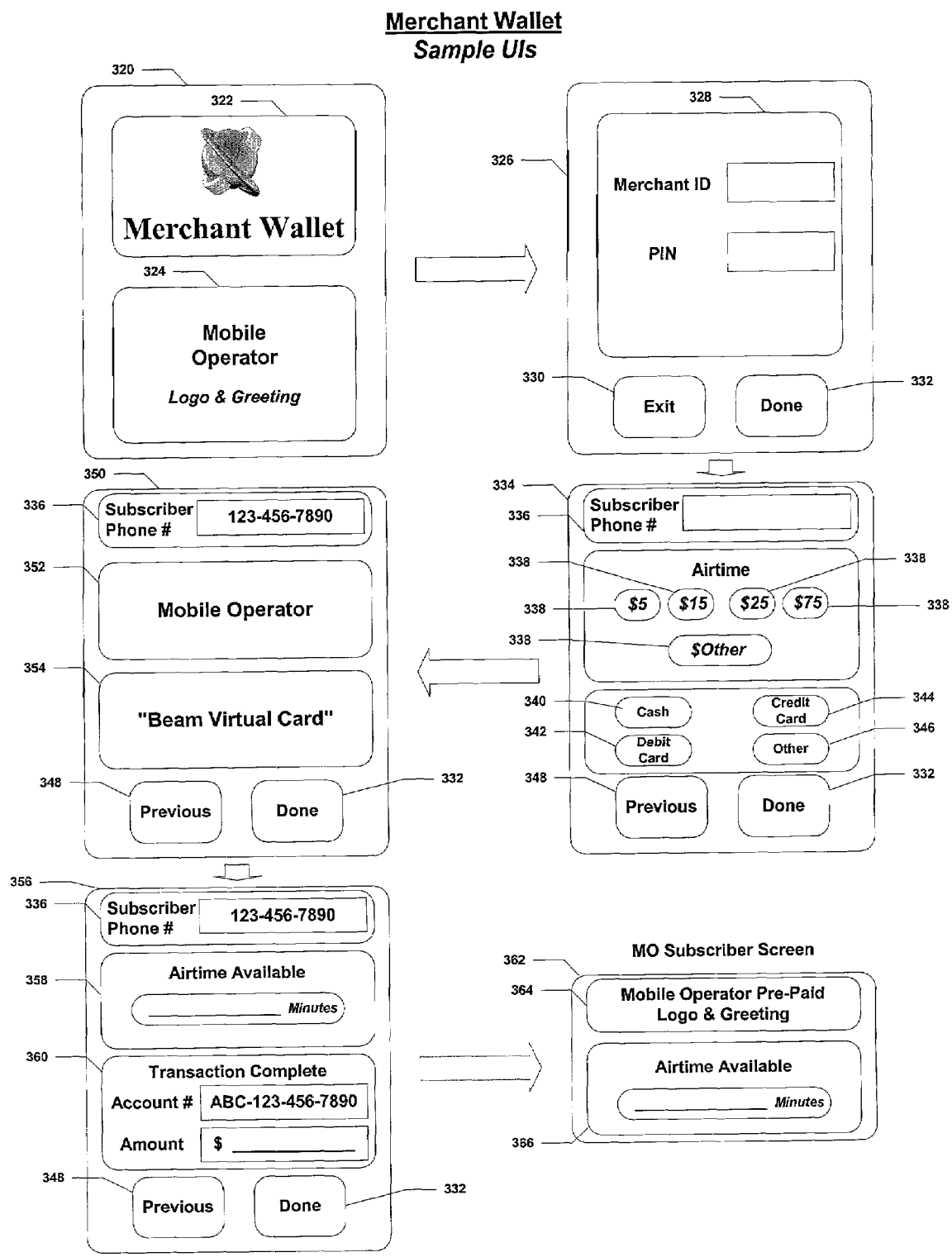
FIG. 13 is a diagram depicting a preferred embodiment of the Merchant Wallet Sample User Interfaces is of the present invention.
Figure 14:
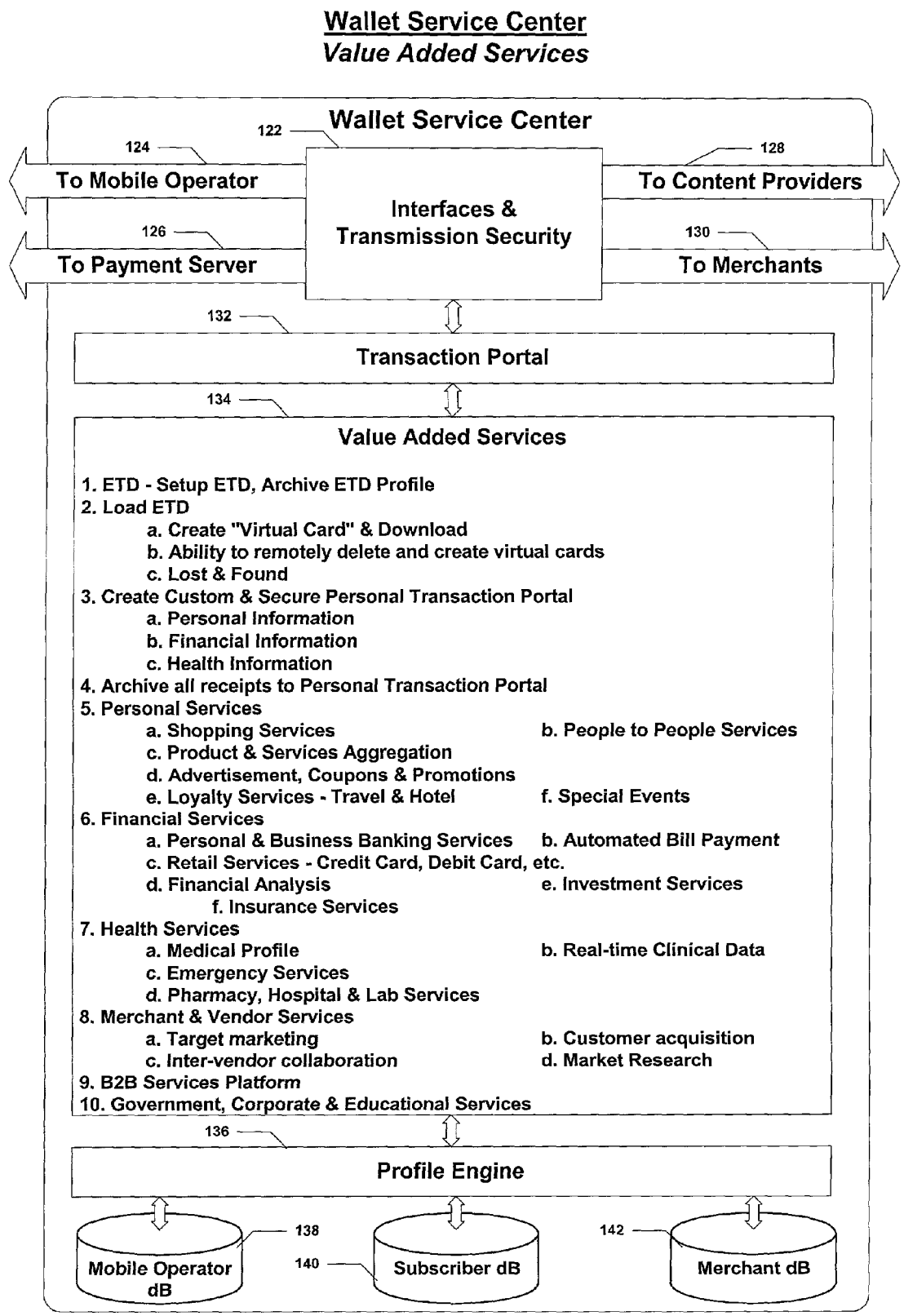
FIG. 14 is a diagram depicting a preferred embodiment of the Wallet Service Center Value Added Services of the present invention.

FIG. 3 illustrates examples of the pre-paid distribution systems of the present invention. A MO Subscriber Handset 102 may be topped up by way of an electronic transaction device (ETD) adapted to the functions of a Merchant (hereinafter Merchant ETD 104). Electronic transaction devices include, but are not limited to, devices such as the Universal Electronic Transaction Card as disclosed in U.S. Pat. Nos. 5,590,038 and 5,884,271, which are incorporated by reference. To facilitate the transaction. the MO Subscriber may also have a MO Subscriber ETD 106 adapted to communicate with the Merchant ETD 104. The MO Subscriber ETD 106. It may be a separate device as illustrated, or it may be embedded in the MO Subscriber Handset 102. Alternatively, the subscriber may communicate with Merchant ETD 104 as illustrated in FIGS. 12, 13, and 14. The Merchant ETD 104 is in electronic communication with MO Network 108. MO network 108 includes MO Switch 110, Wallet Service Centers 112, MO Pre-paid Server 114, and Payment Server 116.

FIG. 3 illustrates three examples of the invention. The first example, which is labeled "Retail Cash & Credit Card Payment," permits the MO, using a Merchant ETD 104, to distribute pre-paid airtime by taking cash or credit cards, debit cards, etc. from their customers. This typically relates to retail environment—grocery stores, gas stations, department stores, etc.—where a merchant using the Merchant ETD 104 may distribute pre-paid airtime using the MOs network or a proximity method.

The merchant enters relevant information into the Merchant ETD 104, such as value purchased information and subscriber information. Value purchased information includes, for example, the quantity of airtime purchased, the quantity of funds transferred, mode of payment (i.e., cash, credit, or other form of payment), authorization information, or other like information. Subscriber information includes, for example, an identification of a person providing a payment (including cash transactions), a telephone number for the MO subscriber handset, or other such information. Once the information is entered, the merchant transmits it in a secured manner to MO Switch 110, which, in turn transmits it to a payment consolidation center, such as Wallet Service Center ("WSC") 112 (See FIGS. 4, 14). The WSC 112 authenticates the MO Subscriber Handset 102 and tops-up the MOs Pre-paid Server 114. The MO will then send a message, for example, a Short Message Service (SMS) message, to the MO Subscriber Handset 102 updating the available airtime. This method may be used with existing generation mobile handsets.

The Retail Cash & Credit Card Payment example also illustrates an example involving the transmission of a "virtual card" to the distribution outlets and, subsequently, to MO Subscriber Handsets 102. The MO distributes virtual pre-paid cards to distribution outlets, using the Wallet Service Center 112 and Merchant ETDs 104 at the respective distribution centers. The virtual cards may be distributed wirelessly and securely. The distribution outlet may use the Merchant ETD 104, upon payment for airtime, to directly "beam" into the MO Subscriber Handset 102 a virtual pre-paid card. "Beaming" may be accomplished using infrared, such as IrDA, proximity RF, or other suitable transmission protocols and circuits. For a secure transmission of the virtual pre-paid card from the Merchant ETD 104 to the MO Subscriber Handset 102, an electronic transaction device application may be installed on the MO Subscriber Handset 102. A MO Subscriber Handset 102 with an electronic transaction device application can also beam the payment directly into the Merchant ETD 104, using either a stored value account, or an existing credit, debit, bank card, etc. account. The electronic transaction device application may store the transaction record, and upload the records to a custom transaction portal at the WSC 112.

The example labeled as "MO Certified Cash & Credit Card Payment" allows subscribers to replenish their pre-paid airtime using the same methods detailed above—i.e. using the MOs network or the proximity method. This example differs from the Retail Cash & Credit Card Payment in that the MO certified centers of distribution includes banks, ATM's, and other special outlets. Additionally, a Merchant ETD local database 118 is coupled to the MO Network 108. As outlined in FIG. 3, these centers may also be equipped with Merchant ETDs 104. Subscribers with a regular mobile handset may top-up their pre-paid accounts using the MO network, and those with the electronic transaction device application installed may use the proximity method to top-up their pre-paid account. The Merchant ETD local database 118 allows the merchant to perform batch transactions, and allows the merchant to compile the subscriber usage information locally.

The Merchant ETD 104 is equipped to conduct a real-time, or batch mode transaction, for both the proximity method and the method using the MO network. The Merchant ETD local database 118 may have a wired or wireless connection with the Merchant ETD 104, or may be connected to a local area network (LAN) associated with a merchant. Where the MO certified distributors have a direct interface with the MO's pre-paid server and database, the Merchant ETD 104 integrates into their existing LAN structure.

In additional embodiments, the Merchant ETD 104 may be distributed to non traditional distribution outlets, such as taxi drivers, where the backend authentication hook-up may be wireless. The contemplated non-traditional distribution outlets would have the ability to do real-time or batch transactions.

The example labeled "Only Credit Card Payment," demonstrates the setup and top-up operations using a MO Subscriber Handset 102 having an embedded MO Subscriber ETD 106 and the MOs automated system for setup and top-up operations for pre-paid airtime. The electronic transaction device application user interface provides the MO subscriber with a user-friendly device to complete the setup and top-up operations for pre-paid airtime accounts. In one example, the electronic transaction device application may be configured to store payment information locally on the mobile handset and send payment information (credit card or debit card details, etc.) every time a transaction is conducted. This information is securely sent to the WSC, through the MO switch, and to the respective payment servers and MO pre-paid server and database. Based on this process, the transaction may be considered a "Card Holder Present Transaction." Card Holder Present Transactions typically have lower processing fees than Card Holder Not Present Transactions.

Figure 4:
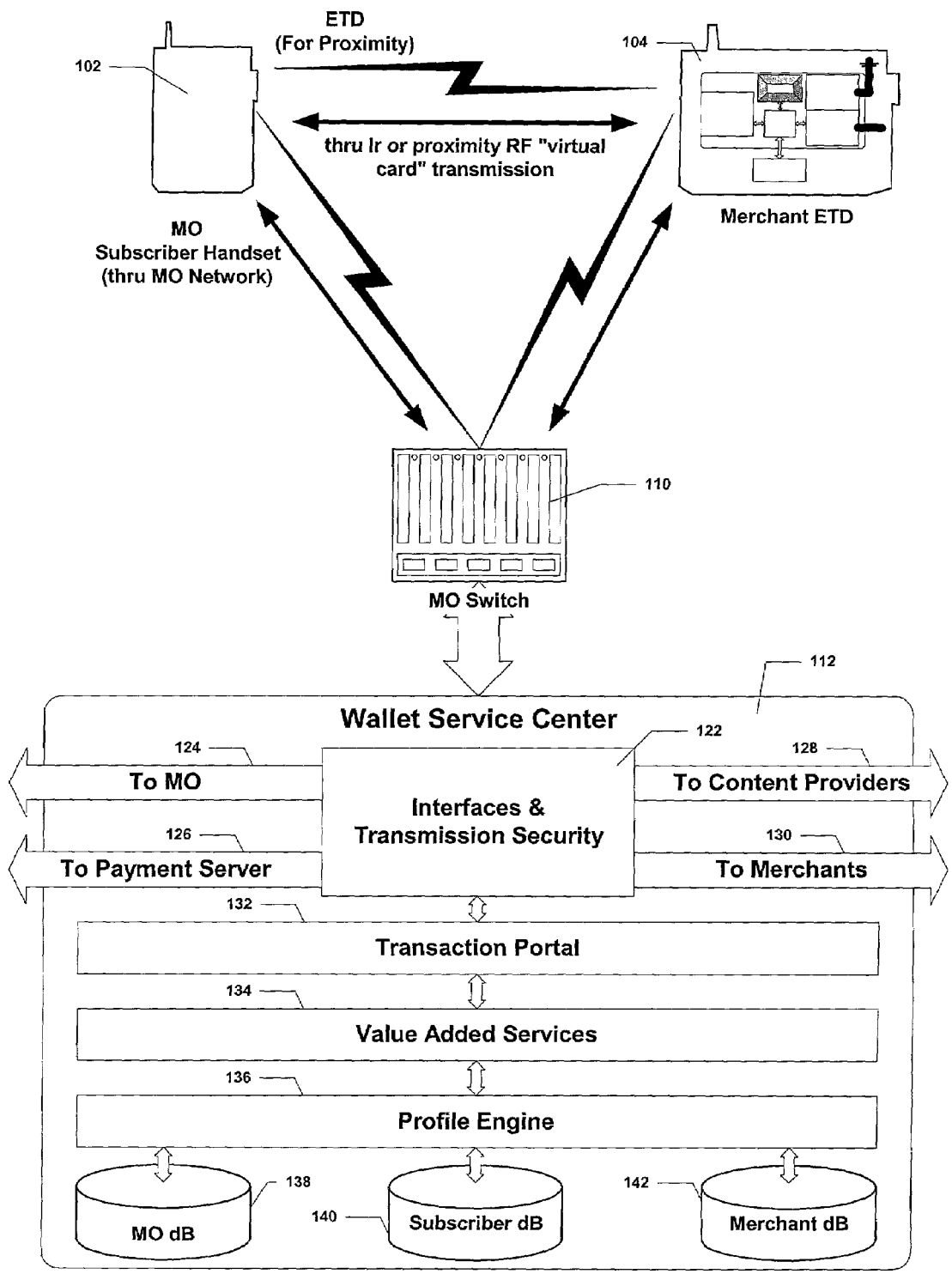
FIG. 4 is a diagram depicting a preferred embodiment of the Retail & MO Certified Cash & Credit Card Payment of the present invention.

FIG. 4 illustrates in more detail the Retail & MO Certified Cash & Credit Card Payment" example. The MO Subscriber Handset 102 may be configured with the electronic transaction device application (i.e., embedded MO Subscriber ETD 106). Electronic communication, such as via proximity RF (such as Bluetooth) or Infra Red (such as IrDA) is established with the Merchant ETD 104. The Merchant ETD 104 is in electronic communication, preferably wireless communication, with MO Gateway. The MO Gateway is coupled to the WSC. The WSC includes, for example, an interface and security module 122, having a MO Interface 124, a payment server interface 126, a content provider, interface 128, and a Merchant interface 130, the interface and security module 122 is coupled to a transaction portal 132. The transaction portal 132 is coupled to a added services module 134, which is coupled to a profile engine 136. The profile engine 136 interfaces with databases 138 such as a MO database 138, a Subscriber database 140, and a Merchant database 142.

Figure 5:
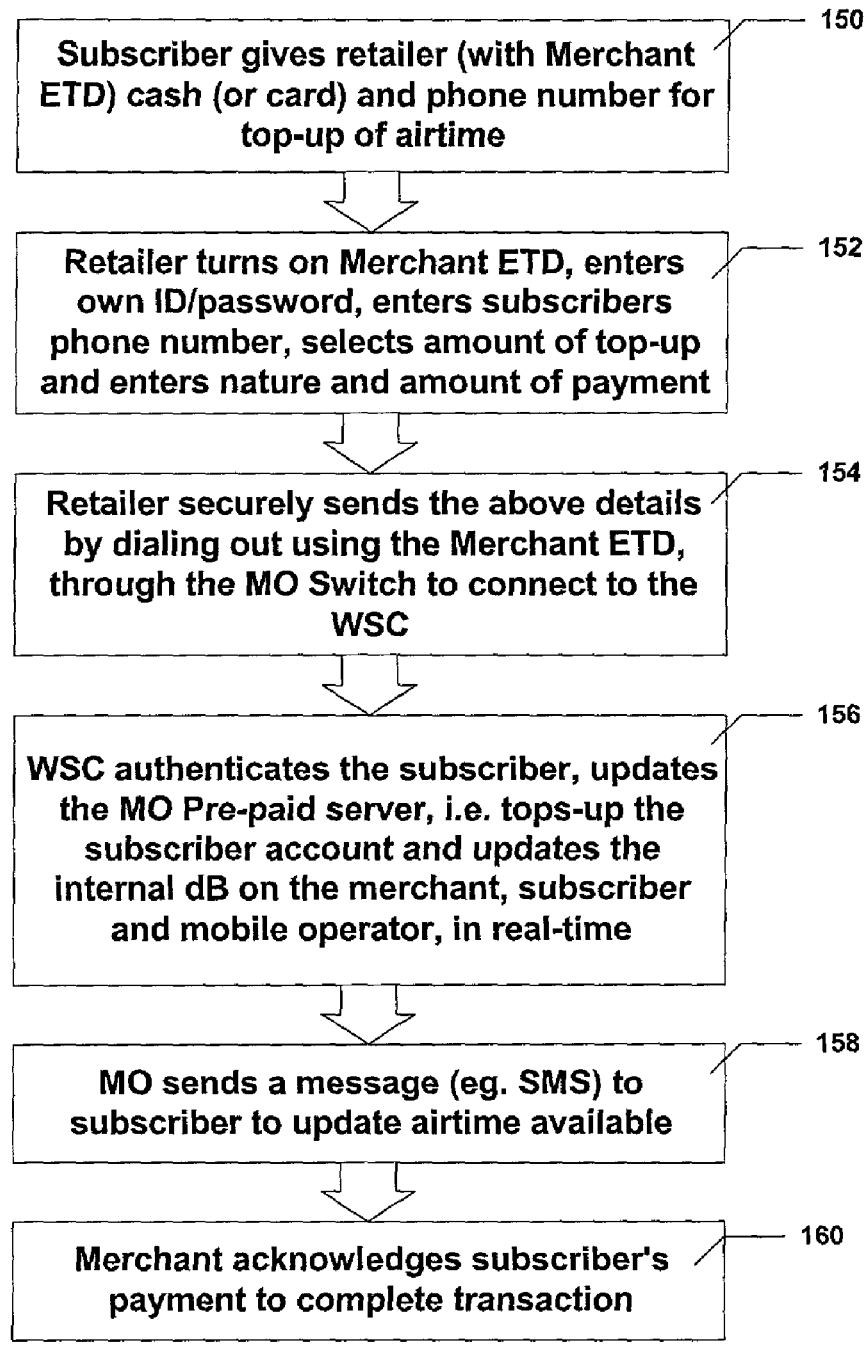
FIG. 5 is a diagram depicting a preferred embodiment of the Retail & MO Certified Cash & Credit Card Payment Through MO Network of the present invention.

FIG. 5 is a process flow-chart for the pre-paid application in a retail and MO certified environment, using either cash or credit cards as the form of payment, using the mobile operator's network. In step 150, the MO Subscriber gives the Merchant ETD 104 equipped retailer cash or a credit card and a telephone number of the MO Subscriber Handset. In step 152, the Retailer enters the telephone number and desired amount of the service to purchase. Alternatively, steps 150 and 152 may be performed electronically if the MO Subscriber Handset 102 includes the electronic transaction device application. In step 154, the Merchant ETD 104 may connect to the MO switch by dialing the MO or otherwise setting up communication over available data exchange formats, such as conventional CDPD, TDMA, CDMA and GSM formats, to connect to the WSC. In step 156, the WSC authenticates the MO Subscriber and updates the MO Pre-paid Server. Additionally, the WSC updates databases for the retailer, MO Subscriber, and MO. In step 158, the MO sends confirmation to the MO Subscriber, which may be by way of SMS (Short Message Service), and in step 160 the Merchant acknowledges payment.

Figure 6:
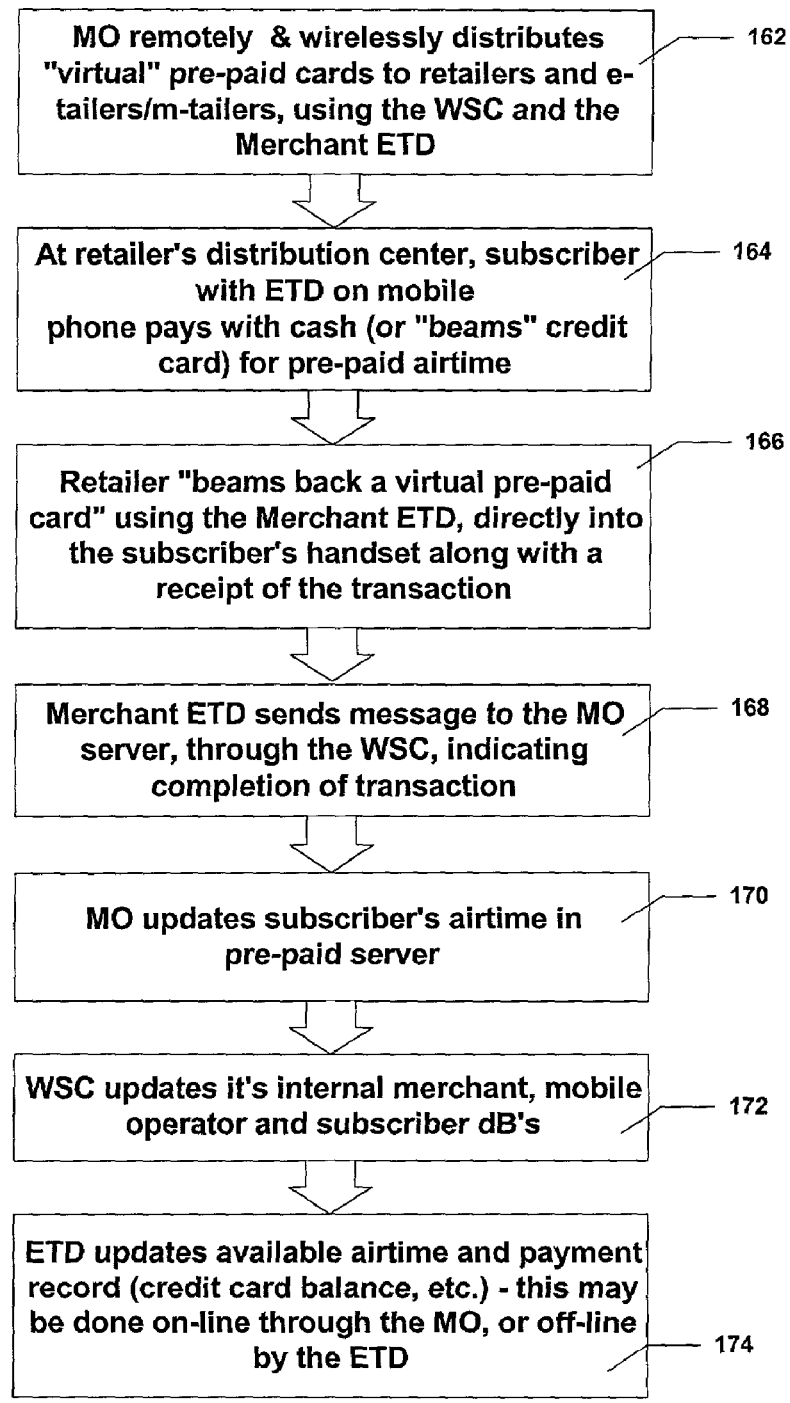
FIG. 6 is a diagram depicting a preferred embodiment of the Retail & MO Certified Cash & Credit Card Payment Through Proximity of the present invention.

FIG. 6 is a flow-chart, for illustrating one example pre-paid application in a retail or MO certified environment, using either cash or credit cards as the form of payment, using the proximity transmission method. In step 162, the MO distributes virtual pre-paid cards merchants. In the illustrated example, the virtual pre-paid cards are distributed by the WSC to Merchant ETD 104*s* wirelessly. In step 164, the MO Subscriber may purchase a Virtual Card by electronically communicating cash or credit card information from the MO Subscriber Handset 102 to the Merchant ETD. The electronic communication may be proximity RF or Infra Red optical. In step 166, the Merchant electronically transfers the Virtual Card to the MO Subscriber's Handset. A receipt may be included with the Virtual Card transfer. In step 168, the Merchant ETD 104 sends information pertaining to the Virtual Card transaction to the MO Server by way of the WSC. In step 170, the MO updates the value in the MO subscriber's account. In step 172, the WSC updates databases such as the Merchant database, the MO database, and the MO Subscriber database. In step 174, the electronic transaction device application on the MO handset may also update the available airtime and payment records. This example requires the MO Subscriber Handset 102 to be infra red or proximity RF enabled devices (the process flow-charts in FIGS. 5 & 6 relate to the configuration described in FIGS. 3 & 4).

Figure 7:
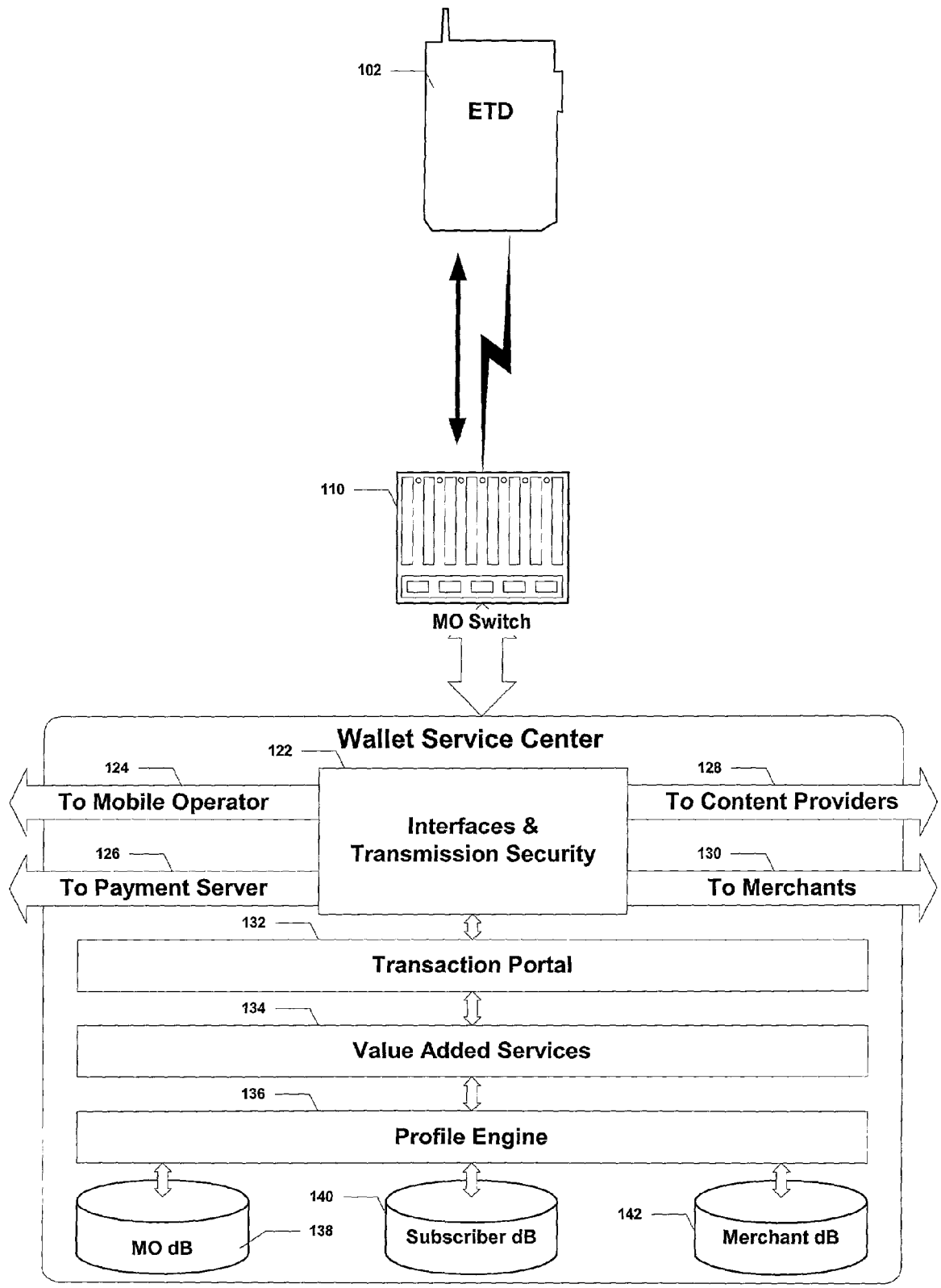
FIG. 7 is a diagram depicting a preferred embodiment of the Only Credit Card Payment of the present invention.

FIG. 7 is a more detailed illustration of the "Only Credit Card Payment" example for pre-paid applications. The MO Subscriber Handset 102, including the electronic transaction device application, is in direct communication with the MO switch. The MO switch is coupled to the WSC by MO switch 110 The WSC includes, for example, interface and security module 122, coupled to the MO interface 124, payment server interface 126, Content Provider Interface 128 and Merchant Interface 130. The interface and security module 122 is coupled to transaction portal 132. The transaction portal 132 is coupled to a valve added services module 134, which is coupled to a profile engine 136. The profile engine 136 interfaces with databases such as the MO database 138, Subscriber database 140, and Merchant database 142.

Figure 8:
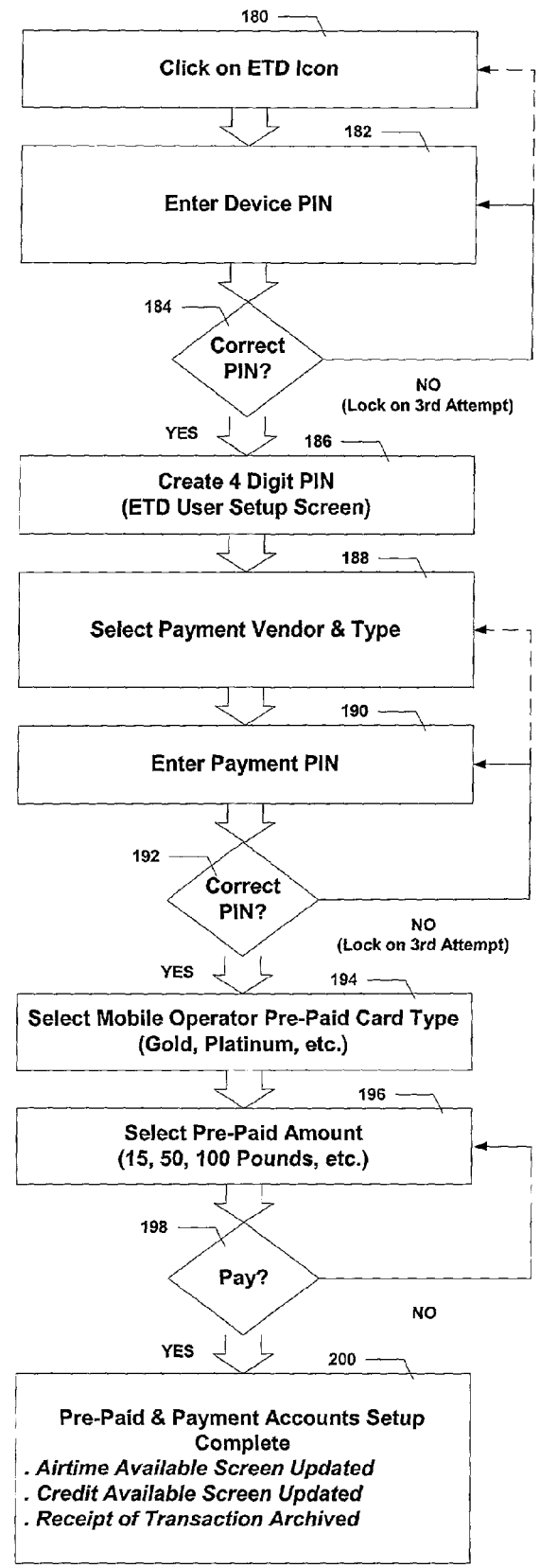
FIG. 8 is a diagram depicting a preferred embodiment of the Only Credit Card Payment Setup Sequence Flow Chart of the present invention.
Figure 9:
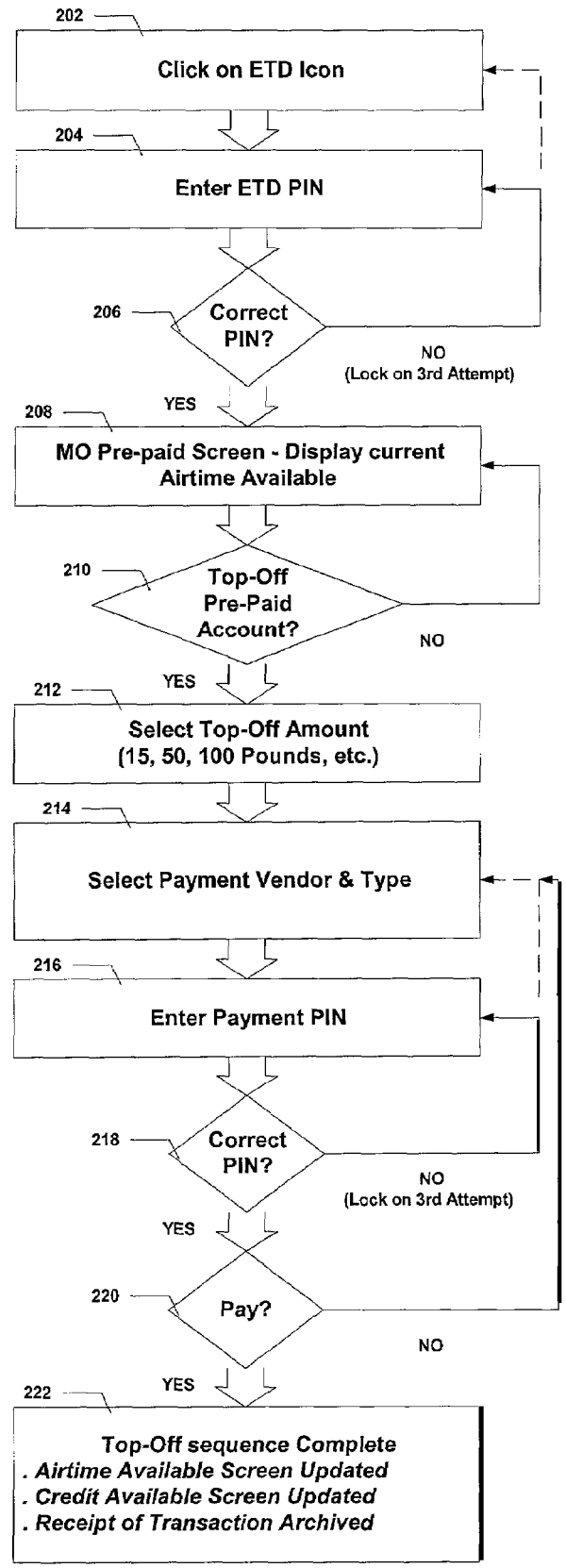
FIG. 9 is a diagram depicting a preferred embodiment of the Only Credit Card Payment "Top-Off" Sequence Flow Chart of the present invention.

FIGS. 8 & 9 are process flow-charts which detail the setup and top-up operations for this particular pre-paid configuration. Referring to FIG. 8, an example of steps which may be used to initialize and use a MO Subscriber Handset 102 with an electronic transaction device application is illustrated. In step 180, a first time user activates an ETD icon 180 and in step 182 enters a MO Subscriber Handset 102 personal identification number (PIN). In the illustrated example, in step 184, a sequence will halt further use of the MO Subscriber Handset 102 after three incorrect entries. This sequence may be performed off-line.

In step 186 the MO subscriber then enters a 4 digit personal identification number (PIN) into the MO Subscriber Handset. This is to "tie-up" the subscriber, the MO Subscriber Handset 102, and the electronic transaction device application. This PIN will be matched internally to the unique MO Subscriber Handset 102 identification number PIN and error message generated for incorrect PIN. The entry of a PIN also provides user validation for a "Card Holder Present" transaction. This sequence typically will not be repeated after the initial setup is completed successfully. On subsequent uses, only electronic transaction device PIN is required. This sequence may be performed off-line.

In step 188 the MO subscriber selects payment vendor and type, and in step 190 enters a payment PIN. A Payment PIN may be pre-assigned by Payment Vendor. A Payment vendor may create a "Digital Signature" for every account and/or PIN created at the server. On verification of Payment PIN, step 192, the server will download the card details to the MO Subscriber Handset 102. The card details may include the digital signature. The digital signature is stored locally on the MO Subscriber Handset 102 for subsequent use. This sequence may be performed on-line.

In step 194, the MO subscriber may then select a type of MO pre-paid card (Gold, Platinum, etc.) and in step 196 an amount for the pre-paid card. The MO Subscriber Handset 102 with ETD application may dial out to the Wallet Service Provider and/or MO Server and download Pre-Paid Account details from the Server. This unique pre-paid account detail is stored on the MO Subscriber Handset 102 for subsequent use.

When the MO subscriber confirms payment in step 198, The MO Subscriber Handset 102 with ETD application may dial out to the Wallet Service Provider, debit the Payment account with the amount selected, and credit the Pre-Paid account at the WSC/MO server in step 200. A receipt acknowledging the request and confirming payment may be returned to the MO Subscriber Handset 102.

The Airtime minutes available, available Credit with the Payment Partner and Receipt for the transaction may all be stored on the device. Real time data is obtained from the respective servers during on-line sequence. All subsequent computations may be internal to the MO Subscriber Handset 102 having the ETD application.

Referring to FIG. 9, an example of a credit card payment top off sequence flow chart is illustrated. The MO subscriber activates an ETD icon on the MO Subscriber Handset in step 202, and then enters a PIN in step 204. The PIN is verified as correct in step 206. The PIN is "tied-up" to the SIM Card on the MO Subscriber Handset 102. The PIN entered is matched to the PIN stored in the ETD application during the setup sequence, illustrated in FIG. 8.

In step 208, display may be activated to display current airtime available for use. In step 210, the MO subscriber may be queried as to whether to top off the pre-paid account. If yes, the MO subscriber may select the top off amount in step 212, select payment and vendor type in step 214, and enter a payment vendor PIN in step 216. PINs may be different for different payment vendors.

In step 218, if the PIN is correct, payment is confirmed in step 220. "PIN & Pay" triggers transmission of Digital Signature/Payment Account details stored on the device, along with the amount selected in step 222. This encrypted and secure information is sent to the WSC/Payment server. On verification, the amount is debited from the Payment Server & credited to the MO Pre-paid Server. This may be the only on-line activity during the "top-off" sequence.

Figure 10:
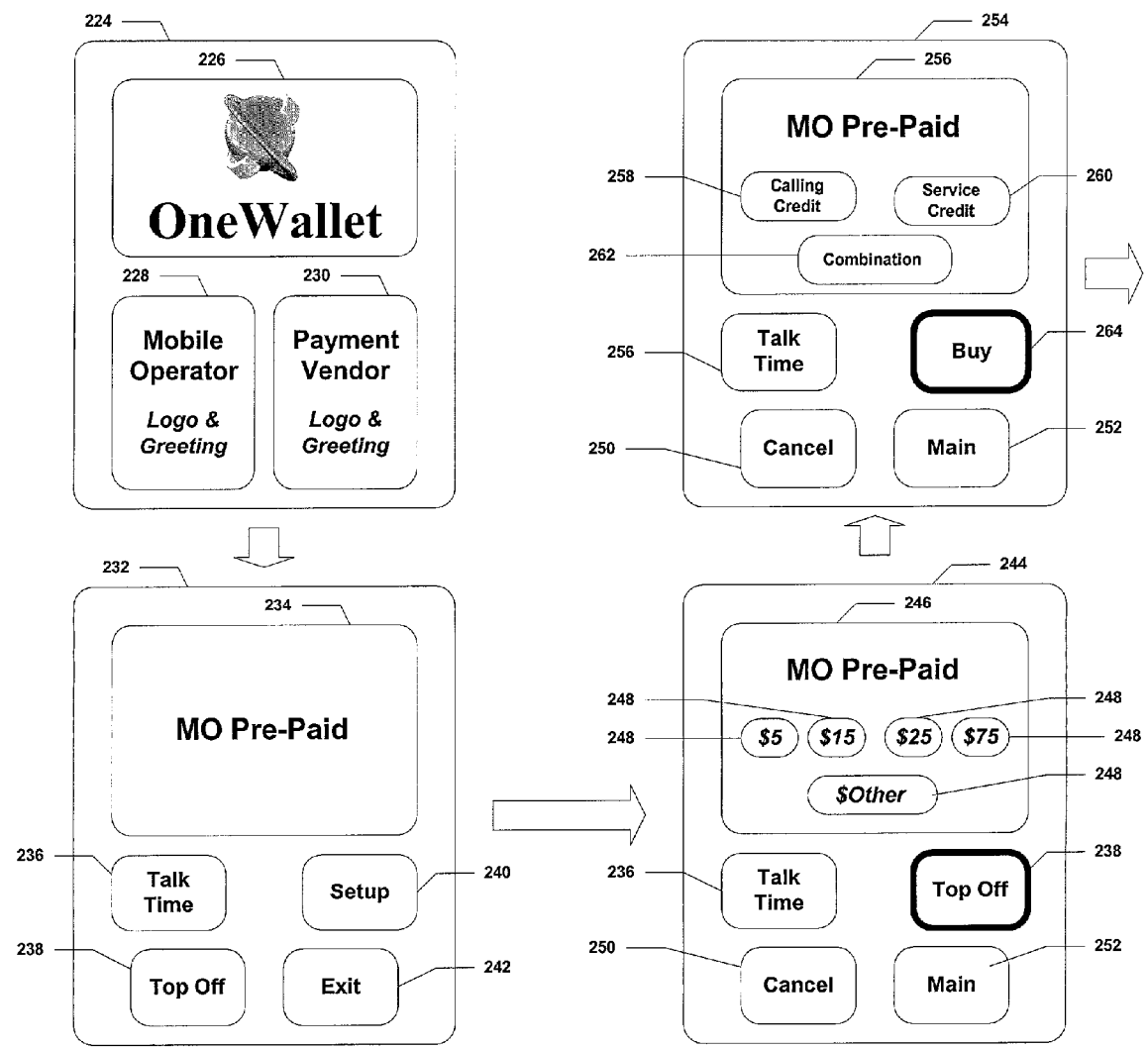
FIG. 10 is a diagram depicting a preferred embodiment of the Only Credit Card Payment Sample User Interfaces is of the present invention.
Figure 11:
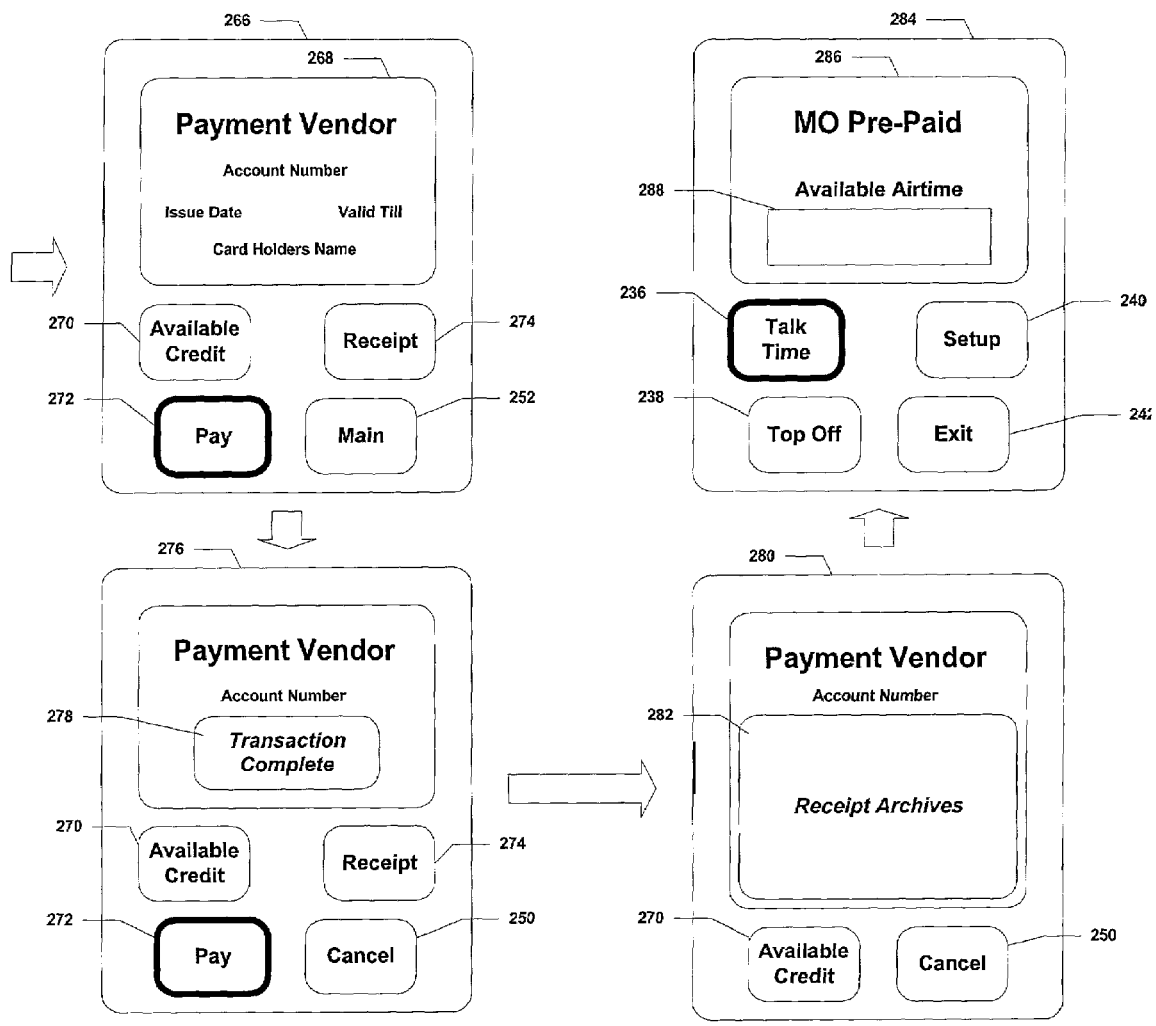
FIG. 11 is a diagram depicting a preferred embodiment of the Only Credit Card Payment Sample User Interfaces of the present invention.

FIGS. 10 & 11 illustrate some User Interface screens on the MO Subscriber Handset 102. Referring to FIG. 10, a first screen display 224, the user interface may include a graphical log for the electronic transaction device 226, a logo for the MO 228, and a log for the Payment vendor 230. A second screen display 232 may include a graphical image of a pre-paid card 234 and icons for talk time 236, top-off 238, set up 240, and exit 242. A third screen display 244, which may be displayed when top-off is selected, includes a MO pre-paid card image 248 with icons 248 for selecting a value to purchase. Additional displayed icons include talk time 236, top-off 238, Cancel 250, and main 252. A Fourth screen display 254 may be displayed after an amount is selected. The fourth screen display includes a MO Pre-paid card image 256 having icons for calling credit 258, service credit 260, and combination 262. An additional icon is a Buy icon 264.

Once the Buy icon 264 is activated, a fifth screen display 266 (FIG. 11) may be displayed. The fifth screen display 266 may include an image of a conventional credit card 268. Icons on the fifth screen display may include available credit 270, Pay 272, Receipt 274, and Main 252.

Once the Pay icon 272 is activated, a sixth screen display 276 may be displayed. The sixth screen display 276 may display a confirmation that the transaction is complete 278, and icons for available credit 270, Pay 272, Receipt 274, and Cancel 250.

A seventh screen display 280 may include icons for receipt archives 282, available credit 270, and cancel 250. An eighth screen display 284 may include an image of a pre-paid card 286 having a display for available air time 288. Icons for the eighth screen display 284 include talk time 236, top-off 238, set up 240, and exit 242.

FIG. 12 illustrates one example of the internal architecture of the Merchant ETD 104. The Merchant ETD 104 may comprise components similar to or the same as a mobile handset—keypad 300, internal hardware, such as system microprocessor, memory software & BIOS 302, the mobile operator's connectivity interface 304 (Analog, Digital, PCS, GSM, etc.) and the wireless interfaces for proximity transmission using infrared or possibly proximity RF 306. The Merchant ETD 104, in addition to the above components typical to mobile handsets, may also have the point of sale interfaces 308 for receipt printers and other peripherals commonly used in a retail environment, such as bar-code scanners, and a modem for conventional local-line access 310. In one example, the Merchant ETD 104 is a software application installed on an existing mobile handset. In alternative examples, the Merchant ETD 104 may be a personal digital assistant ("PDA") or dedicated hardware embodiment with the above outlined modules and enabling software, to conduct secure real-time or batch transactions.

The Merchant ETD 104 includes a software application loaded into the environment, which will allow it to exchange transaction information with another mobile handset with the electronic transaction device functionality (or alternately a UET Card—PDA's, etc., with electronic transaction device functionality), using a proximity method, or using the MO. The proximity method involves the beaming of a virtual pre-paid card from the Merchant ETD 104 to the subscriber's handset, and optionally, the electronic transaction device beaming payment information back into the Merchant ETD 104. The Merchant ETD 104 has the capability to capture this transmission through its infrared or proximity RF transceivers, and process it to complete the transaction. This information is transmitted between the two handsets using existing industry standards and protocols, but is a secure transmission. One example of a server transaction uses the exchange of public/private keys to encrypt/decrypt the data—a PKI scheme), using secure transaction technology ensuring data integrity between the two mobile handsets or devices.

Alternatively, the Merchant ETD 104 may also be programmed to securely upload or beam a "virtual pre-paid airtime card" to another mobile handset in a proximity transmission, maintaining the integrity of the mobile operator's card distribution schemes. The Virtual Card is an electronic version of the physical plastic card. The information, be it an authorization code which is scratched off or any other encoded data, would be transmitted to the Merchant ETD 104 and stored, and consequently delivered or re-transmitted to the receiving mobile handset. One possible configuration of a non-proximity model would include a series of SMS messages between the mobile operator's network and the Merchant ETD 104.

FIG. 13 describes some User Interface potential screens for the Merchant ETD 104, which are based on the process flow charts detailed in FIGS. 5 & 6. A first display screen 320 for the Merchant MTD includes an ETD Logo 322 an a MO logo 324. A second display screen 326 includes a Form 328 for entering Merchant ID and PIN. Also included are icons for Exit 330 and Done 332.

A third display screen 334 includes a form for entry of a MO subscriber telephone number 336, icons for selecting an amount of value purchased 338, icons to select between Cash 340, Debit Card 342, Credit Card 344, or Other 346, and Icons for Previous 348 and Done 332. A Fourth display screen 350 includes a icon to select Mobile Operator 352 and an icon to beam a virtual card 354. A Fifth screen display 356 includes a display of the airtime available 358 for the given telephone number. The Fourth display screen 356 also includes a display confirming completion of the transaction 360. On the MO subscriber handset, a screen display 362 including an identification of the Mobile Operator and logo 364 and available airtime 366 may be displayed.

FIG. 14 illustrates one example of the architecture of the Wallet Service Center (WSC). The WSC connects to the MO Subscriber handsets or electronic transaction devices through the MO switch. The WSC also has interfaces to the MO servers and databases, the Banks or Payment Partners, the Merchants (retail, "e or m-tailers") and Content Providers. The WSC may use a PKI/wPKI based security scheme to secure all the information being transmitted between the various entities outlined above. Some of the core features of the WSC are to support electronic transaction device users and allow all users to create a personalized transaction portal—allow them to archive all transaction records, and setup personal, financial and health information. The WSC, based on the rich profiles it creates, then offers various value added services, such as Personal Services, Financial Services, Health Services, Merchant & Vendor Services, Business to Business Services, and Government, Corporate and Educational Services.

Figure 15:
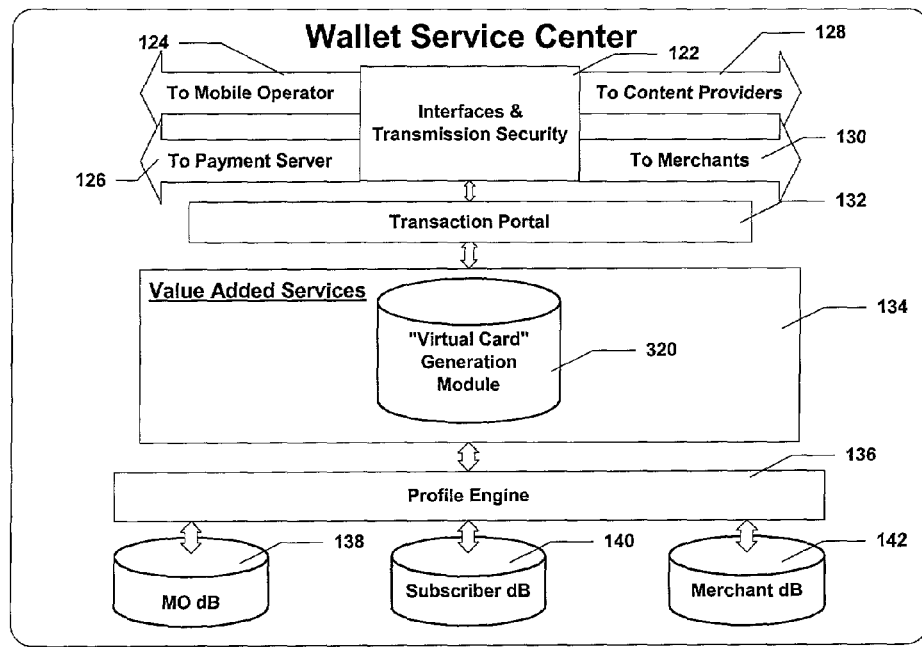
FIG. 15 is a diagram of examples of virtual card generation and download.
Figure 15:
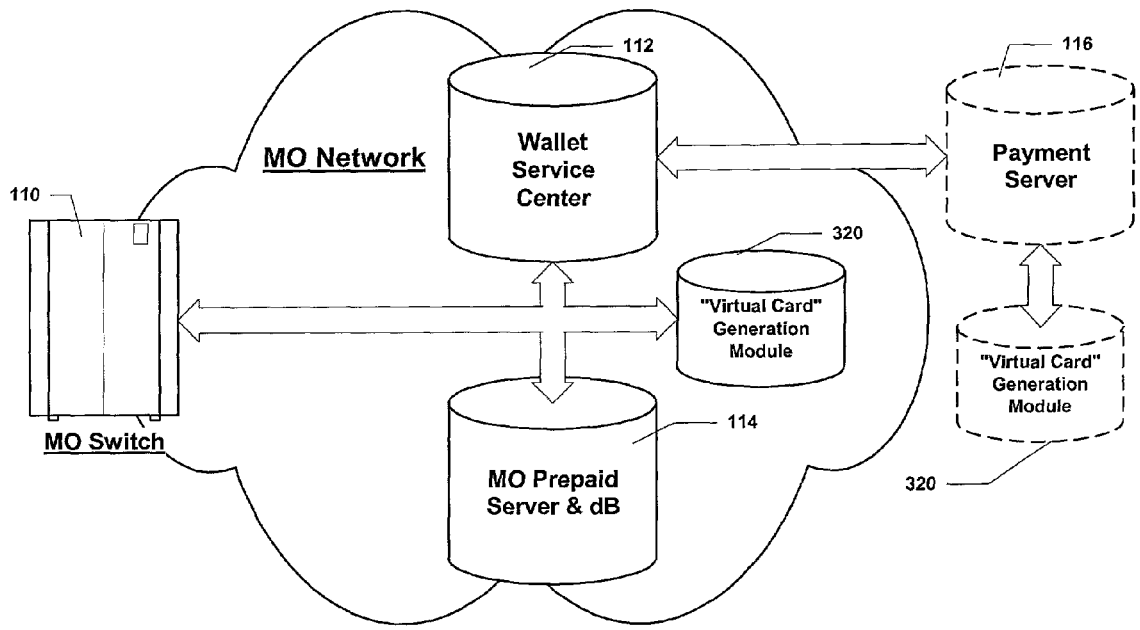

FIG. 15 illustrates an example of a "Virtual Card" Generation & Download. A "Virtual Card" is an electronic version of plastic cards. The Virtual Card is a digital representation of the information which would be conventionally stored on a magnetic stripe, or smart card chip, or a bar code, etc., of a plastic card, along with the logo and branding information securely stored to prevent unauthorized duplication. This information may then be wirelessly transmitted to the MO Subscriber Handset 102, PDA, etc. with electronic transaction device application. The "Virtual Card" generation module 320 is responsible for the creation of Virtual Cards. In one example (labeled A), the "Virtual Card" Generation Module 320 may be hosted in the WSC. The WSC, which has access to the MOs Pre-paid Server and databases, would then create a virtual pre-paid card. This virtual pre-paid card may then be downloaded, or transmitted wirelessly using the MO's Switch to the Merchant ETD 104, or alternately directly into the subscriber's mobile phone. Secure batches of virtual pre-paid cards may be created and downloaded to the Merchant ETD 104, to then be distributed wirelessly by the Merchant ETD 104 using a proximity method (as outlined in FIGS. 4 & 6).

In another example, the Virtual Card generation module may be hosted outside the WSC, but within the MO's Network (labeled B). As may be the case with the generation of Credit Cards, Debit Cards, etc., the Banks and Financial Institutions may not be comfortable with another entity issuing their cards. In such a case, the Virtual Card generation module would be integrated with the Bank's or Financial Institution's payment server. These cards may still be wirelessly downloaded through the MO's Switch.

Figure 16:
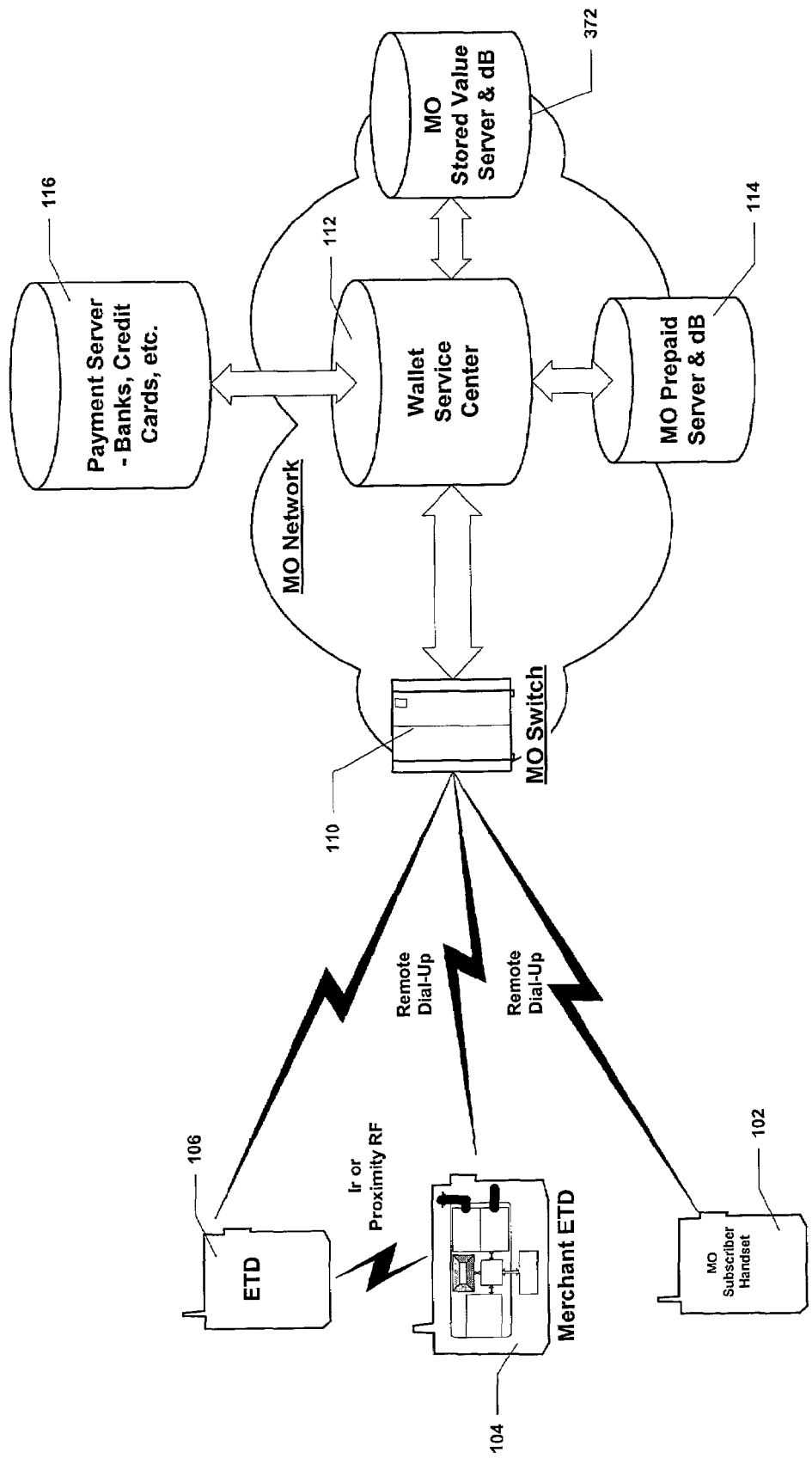
FIG. 16 is a diagram of a stored value application of the present invention.

FIG. 16 describes a "Stored Value Application." Similar to the examples illustrated in FIG. 3 to setup or replenish a pre-paid airtime account (or disable), the mobile operator may setup a stored value account for their subscribers in a MO stored value server and database 372. While a mobile telephone account is used as an example, the use of stored value cards is not limited to telephone applications. For example, stored value cards may be used for cash payments in proximity transactions, such as, but not limited to, vending machines, tolls, parking, and transportation.

The Wallet Service Center 112 may create and manage separate accounts for the MO Subscribers. For example, the Wallet Service Center 112 may create a stored value account, where the MO Subscriber would create a debit account by depositing funds with the mobile operator. The MO Subscriber may then purchase goods from a merchant that uses a Merchant ETD through the examples described earlier e.g., by using a proximity transaction method or using the MO Switch. For example, the MO Subscriber may purchase products and services provided by the merchant including, but not limited to, pre-paid airtime, using the MO Subscriber ETD 106. As in the examples given above, and in the examples that follow, the MO Subscriber ETD 106 may be embedded in the MO Subscriber Handset 102. The merchant follows the same methods described earlier, with the additional step of deducting the amount of the transaction from the stored value account the subscriber creates with the mobile operator.

The authentication of the transaction may involve both the merchant and the MO Subscriber through, for example, a messaging system operated by the mobile operator. A record of the transaction may be provided by the WSC, and/or through the mobile operator's messaging service. In another example, the Merchant ETD transfers a record of the transaction to the MO Subscriber ETD 106. The Wallet Service Center may create and track this account for the mobile operator, as the MO Subscriber uses the funds from this account to pay for products and services purchased from merchants.

In another example, MO Subscribers having a stored value account may obtain a cash advance from the Merchant ETD. In this example, the MO Subscriber liquidates a certain amount of the debit (or credit) account previously setup with the mobile operator. The Merchant ETD effectively becomes an ATM outlet.

In addition to the stored cash value accounts, the mobile operator may decide to add a credit functionality to this process, and become a credit account vendor as well.

The billing in any of these examples may be in the form of a consolidated or separate statements from the mobile operator. The consolidated statement details the airtime used followed by a section that details how the stored value account was depleted. Separate statements, on the other hand, provide separate statements for telephone usage and stored value account usage. The Wallet Service Center may use the mobile operator's messaging system to update the MO Subscriber ETD 106 with balance information. As in the above examples, the ETD may be embedded in a MO Subscriber Handset 102.

Figure 17:
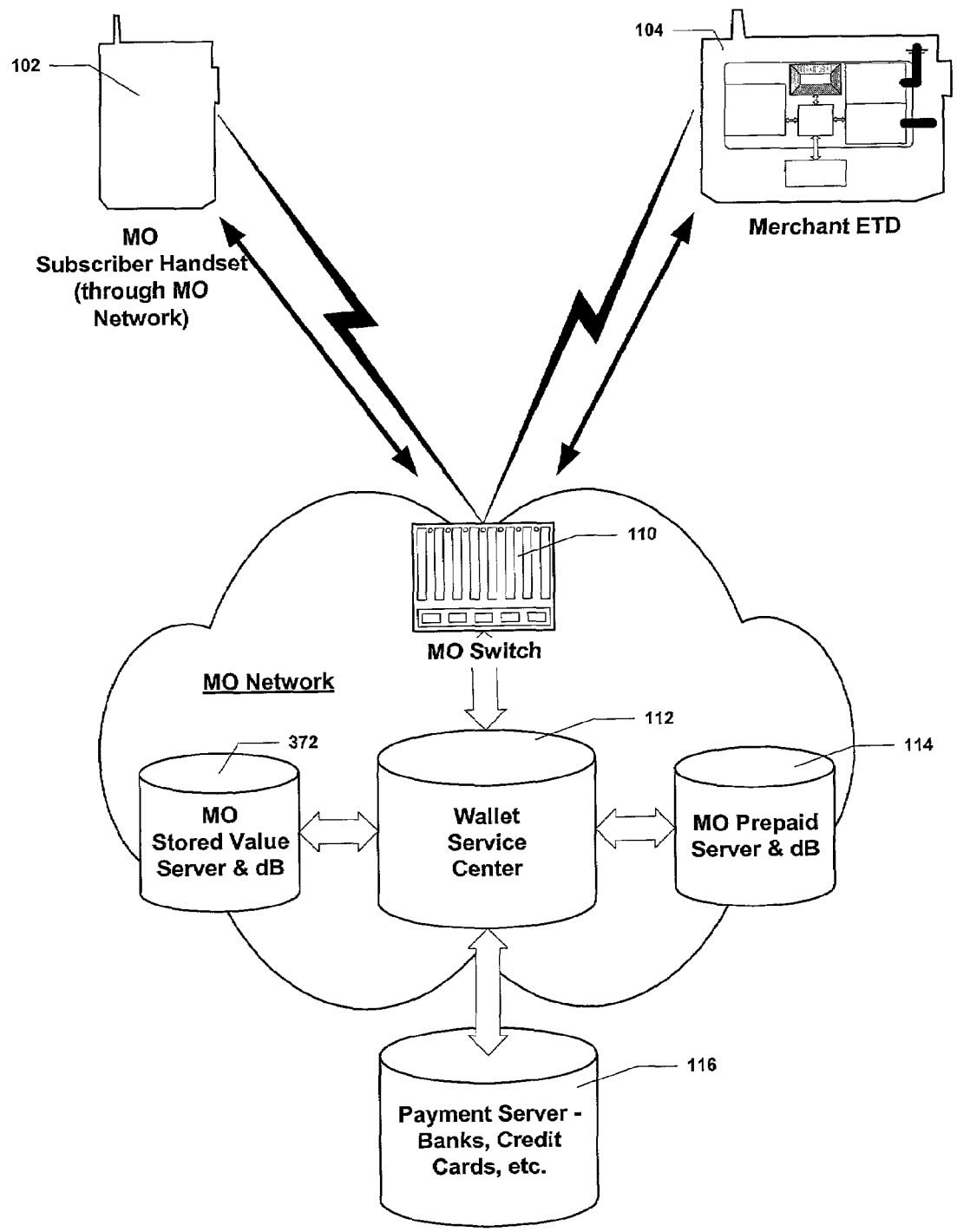
FIG. 17 is a diagram of a preferred embodiment of a stored value transaction system Through MO Network of the present invention.

FIG. 17 illustrates an example of the stored value transaction system using the mobile operator's network. MO Subscriber Handset 102 is in electronic communication with MO switch 110. A merchant POS terminal is also in electronic communication with the MO switch 110. In the illustrated example, the merchant POS is a Merchant ETD 104. Other POS equipment may be suitable. The MO switch 110 is coupled to Wallet Service Center 112. WSC is coupled to MO Stored Value Server 372, MO Prepaid Server 114, and Payment Server 116. This system does not necessarily require any modifications on the subscriber's mobile phone, but merely requires the subscriber to establish a stored value account with the mobile operator. The subscriber may setup a stored value account using, for example, the following methods:

Subscriber may deposit money at a mobile operator certified distribution outlet using cash, credit, debit, check, etc. to pay the merchant. The merchant then dials into the mobile operator's system to update the subscriber's account. The merchant may use the Merchant ETD to update the subscriber's stored value account.

The subscriber may directly access his/her account securely using the ETD to top-up his/her stored value account. The subscriber may replenish the account using a credit card, debit card, or any other acceptable payment product, from the ETD.

The subscriber may access his/her stored value account from the Internet, by paying using a credit card or a debit card.

The subscriber may pay the mobile operator directly, by including an extra payment over and above the billed amount for wireless services every month. This extra amount may then be credited to the stored value account housed by the mobile operator.

Figure 18:
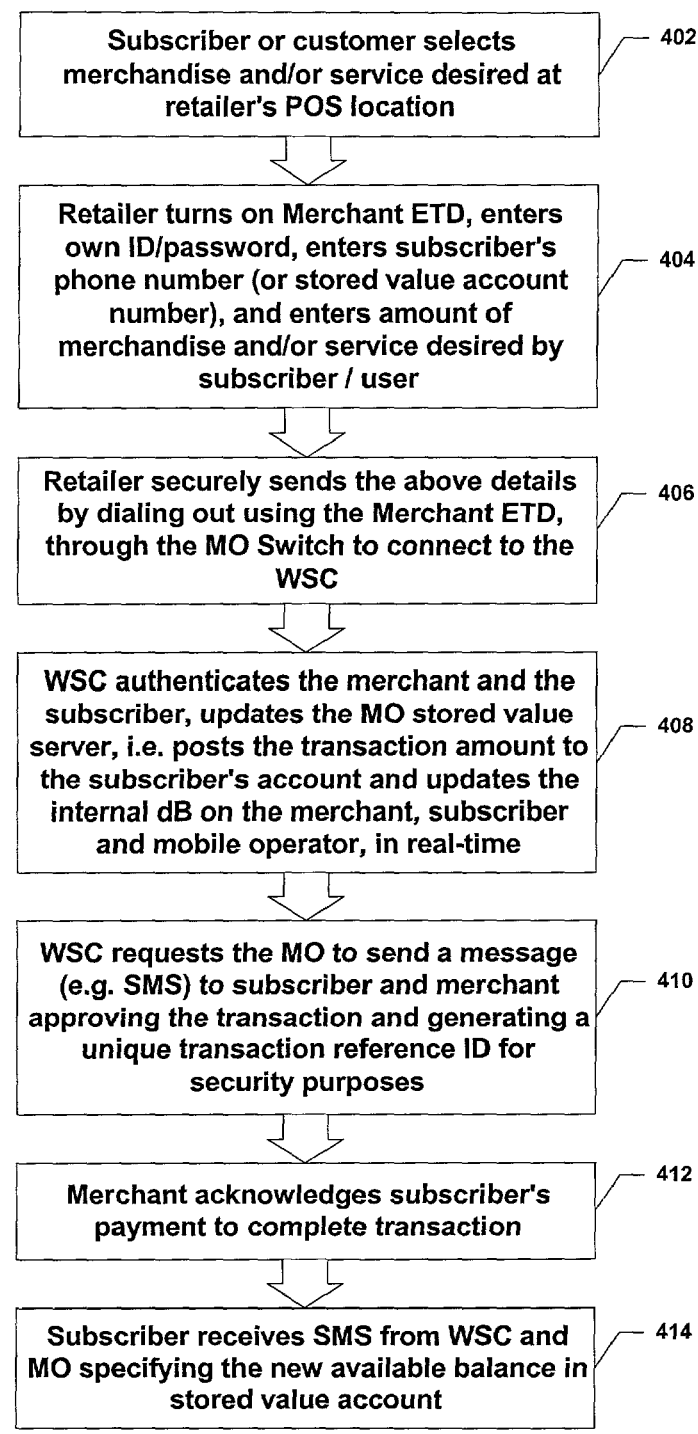
FIG. 18 is a flow chart of a preferred embodiment of a stored value transaction system Through MO Network of the present invention.

Once the MO Subscriber creates the stored value account with the mobile operator, the MO Subscriber may conduct a transaction by merely specifying the account number to the merchant with a Merchant ETD 104. The account number may be a telephone number corresponding to the MO Subscriber. Referring to FIG. 18, in step 402, the MO Subscriber selects merchandise or services at a Merchant's POS location. In step 404, the merchant turns on the Merchant ETD, enters a password, enters the MO Subscriber's account details, and the amount of merchandise/services desired by the MO Subscriber. In step 406, the Merchant sends the information to the WSC, through the mobile operator's switch by the Merchant ETD. In step 408, the WSC authenticates the merchant, the MO Subscriber, and ensures that the stored value account has enough funds (alternately available credit balance, if the mobile operator offers a credit facility to the subscriber) to cover the transaction. The WSC also updates the internal databases on the merchant, subscriber and mobile operator. In step 410, once the transaction is approved, the WSC requests the mobile operator to send a unique transaction ID, for security purposes, in the form of a short message (if service available) to both the merchant and the MO Subscriber, completing the transaction. In step 412, the Merchant acknowledges the MO Subscriber's payment. In step 414, the MO Subscriber received a message, for example, a SMS message, from the WSC specifying the new balance in the stored value account.

Figure 19:
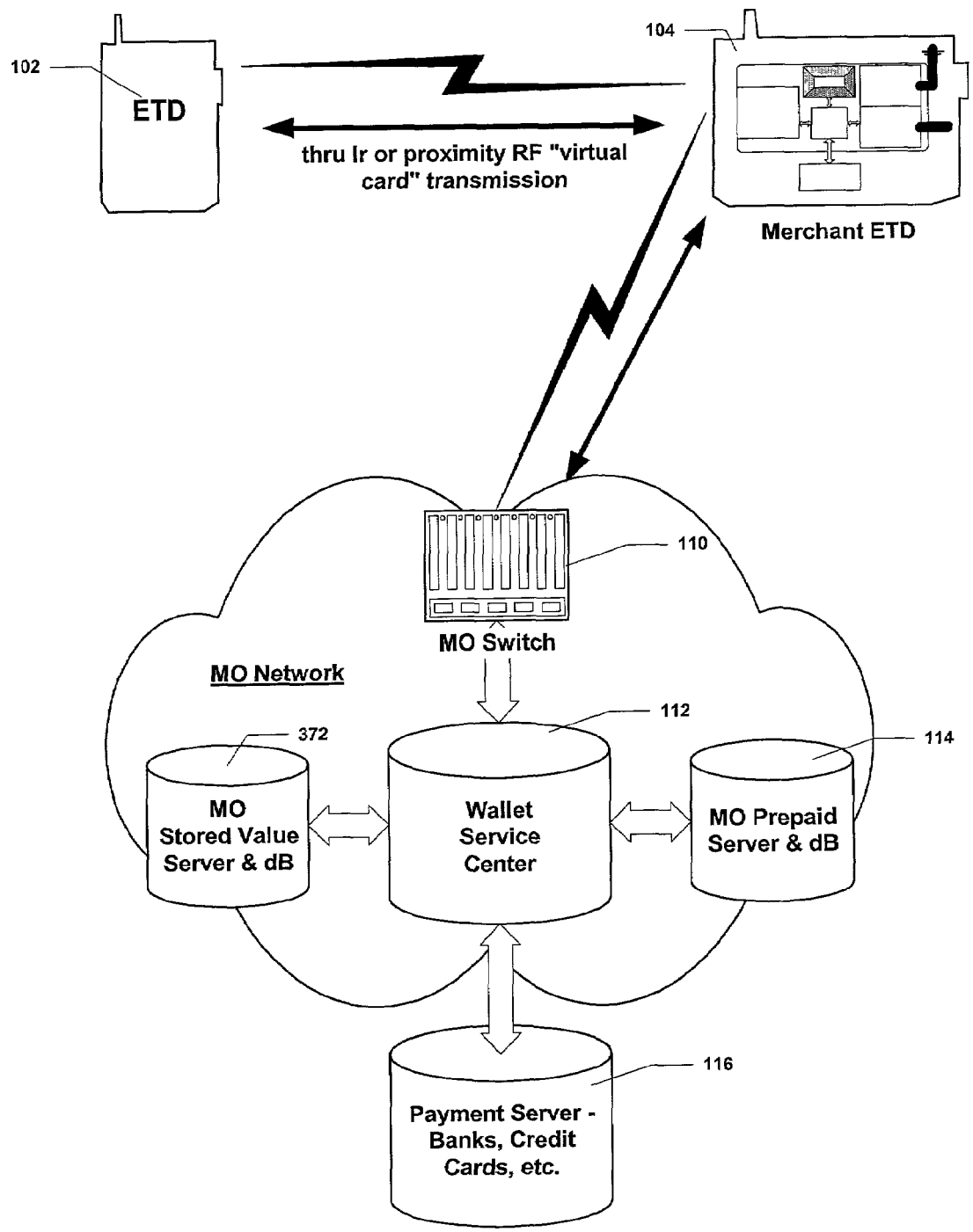
FIG. 19 is a diagram of a stored value transaction system proximity model of the present invention.

FIG. 19 illustrates a proximity transaction based stored value system. MO Subscriber ETD 106 (which may be embedded in MO Subscriber handset 102) is in electronic communication with a merchant POS terminal. In the illustrated example, the merchant POS is a Merchant ETD 104. Other POS equipment may be suitable. The Merchant ETD is in electronic communication with MO switch 110, which is in turn coupled to Wallet Service Center 112. WSC is coupled to MO Stored Value Server 372, MO Prepaid Server 114, and Payment Server 116.

Figure 20:
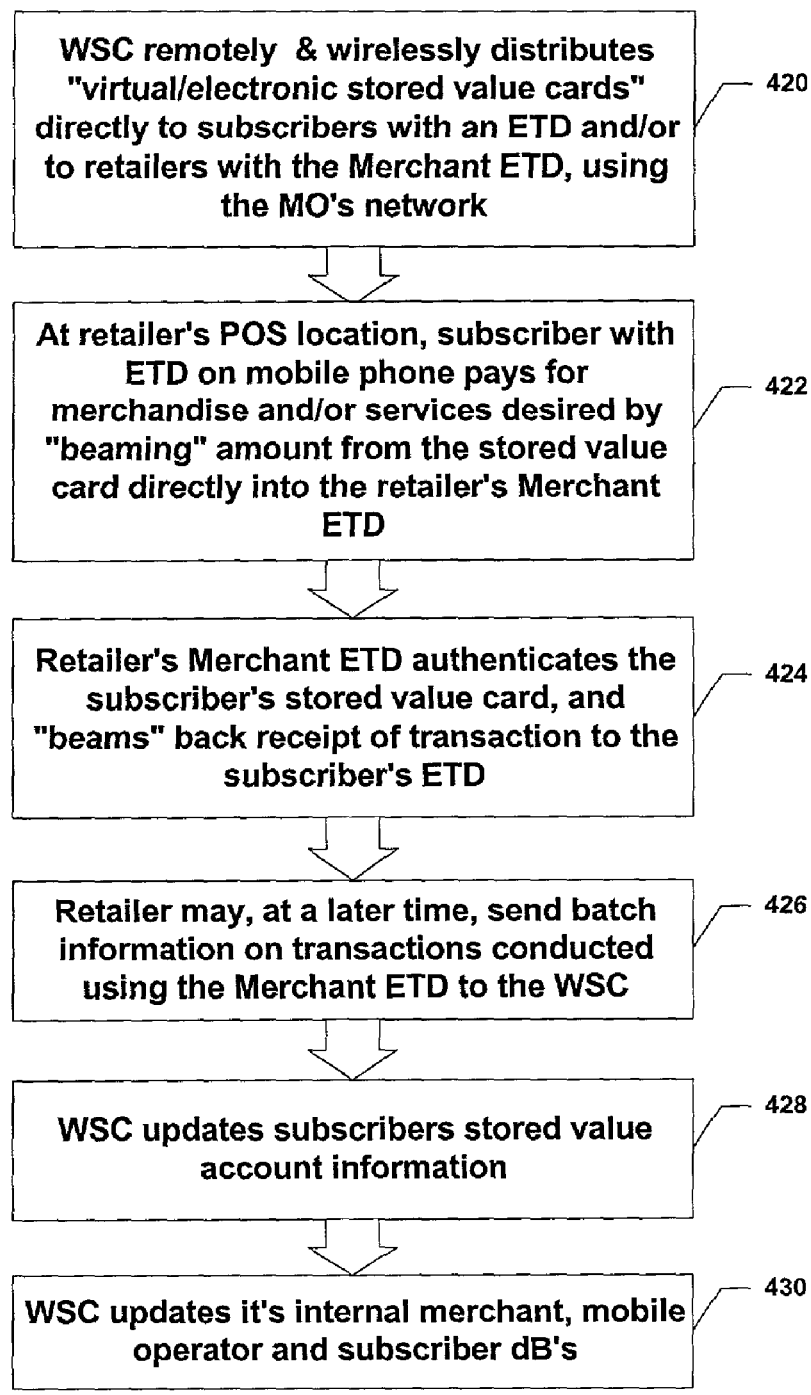
FIG. 20 is a flow chart of a preferred embodiment of a stored value transaction system of the present invention.

Referring to FIG. 20, in use, the WSC distributes electronic, or virtual, stored value cards in step 420. The virtual stored value cards may be distributed directly to the MO Subscriber ETD. Alternatively, the virtual stored value cards may be distributed to the Merchant ETDs. Mobile operator certified distributors may be authorized to distribute these cards on a proximity basis to subscribers. These cards may be purchased at retail locations. In other examples, stored value accounts may be replenished using the methods described above to top off prepaid accounts. The virtual stored value cards may be issued wirelessly and securely, and may be stored in the MO Subscriber ETD, containing user information, issuer information, amount details, and other authentication information.

In step 422, to conduct a transaction using the stored value card, the MO Subscriber selects the card in the ETD, and transfers the desired amount into the merchant POS. Any suitable electronic communication may be used for the transfer, including, but not limited to, infrared or proximity RF. In step 424, the Merchant ETD authenticates the MO Subscriber's virtual stored value card and transfers a receipt of the transaction to the MO Subscriber ETD. In step 426, the merchant uploads relevant transaction information to the stored value server hosted by the WSC and the mobile operator. The upload may be performed at a later time in a batch of transactions. In step 428, the WSC updates the MO Subscriber's stored value account information. In step 430, the WSC updates the internal merchant, mobile operator, and subscriber databases.

The stored value system described herein provides a secure and cost effective transaction network. In part because the stored value system is hosted by the mobile operator and the WSC, wireless transactions are enabled. Also, by using the mobile operator's network, the administration cost of the transaction may be significantly reduced as the number of intermediaries is reduced. The WSC, along with the ETD and the Merchant ETD ensure end to end security, and global deployment. Since authentication may be enforced by the ETD and Merchant ETD at the POS, this system may drastically reduce fraud. The WSC, through its profiling capabilities, can reduce the customer acquisition costs.

The Merchant ETD may be deployed in markets where the existing banking networks do not have a presence, consequently increasing transaction volume for existing banking entities involved in the deployment of this solution. The stored value systems may be effectively extended to minors and credit challenged individuals, again increasing the addressable markets and consequently transaction volume. This system may also be extended for people to people payments, where two individuals with ETD's may transact directly on a proximity basis. The stored value system will also reduce cash transactions and associated costs. Even in markets where the transactions are predominantly cash based, the Merchant ETD, along with the tracking capabilities may be used to reduce fraud and theft.

Figure 21:
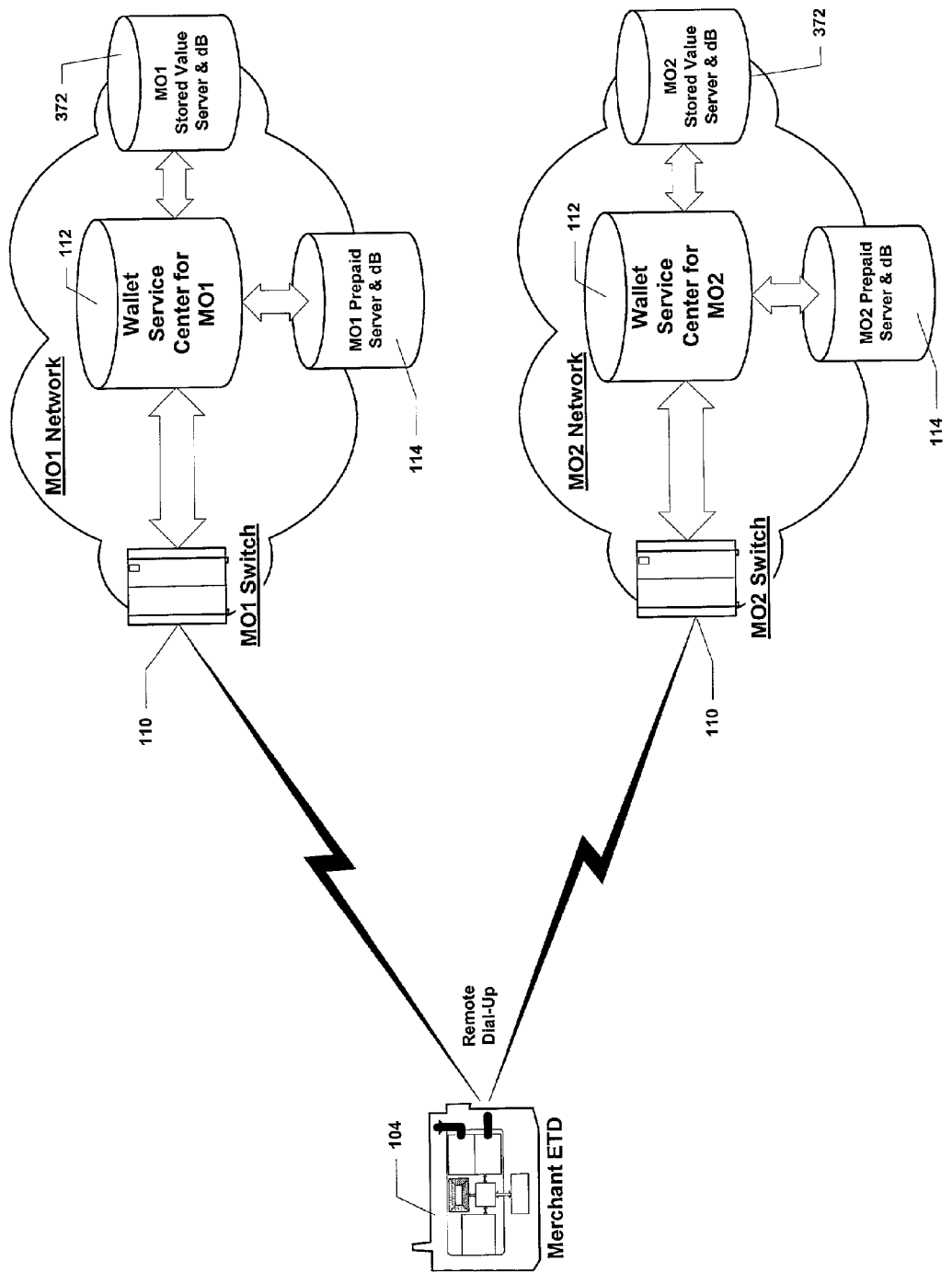
FIG. 21 is a diagram of a multiple MO example of the present invention.

FIG. 21 illustrates an environment in which a single Merchant ETD 104 has the capability to interface with multiple mobile operator networks for the purposes of offering electronic pre-paid airtime or stored value applications, as outlined before, to their respective subscribers. An example would be a single merchant location, enabled with a single Merchant ETD unit, having the capability to electronically issue pre-paid airtime to Sprint PCS, Cellular One, AT&T, PrimeCO, Bell Atlantic, Bell South, etc. subscribers. This same Merchant ETD would also have the capability to allow all the different subscribers to use their respective stored value accounts hosted by the respective mobile operators.

Figure 22:
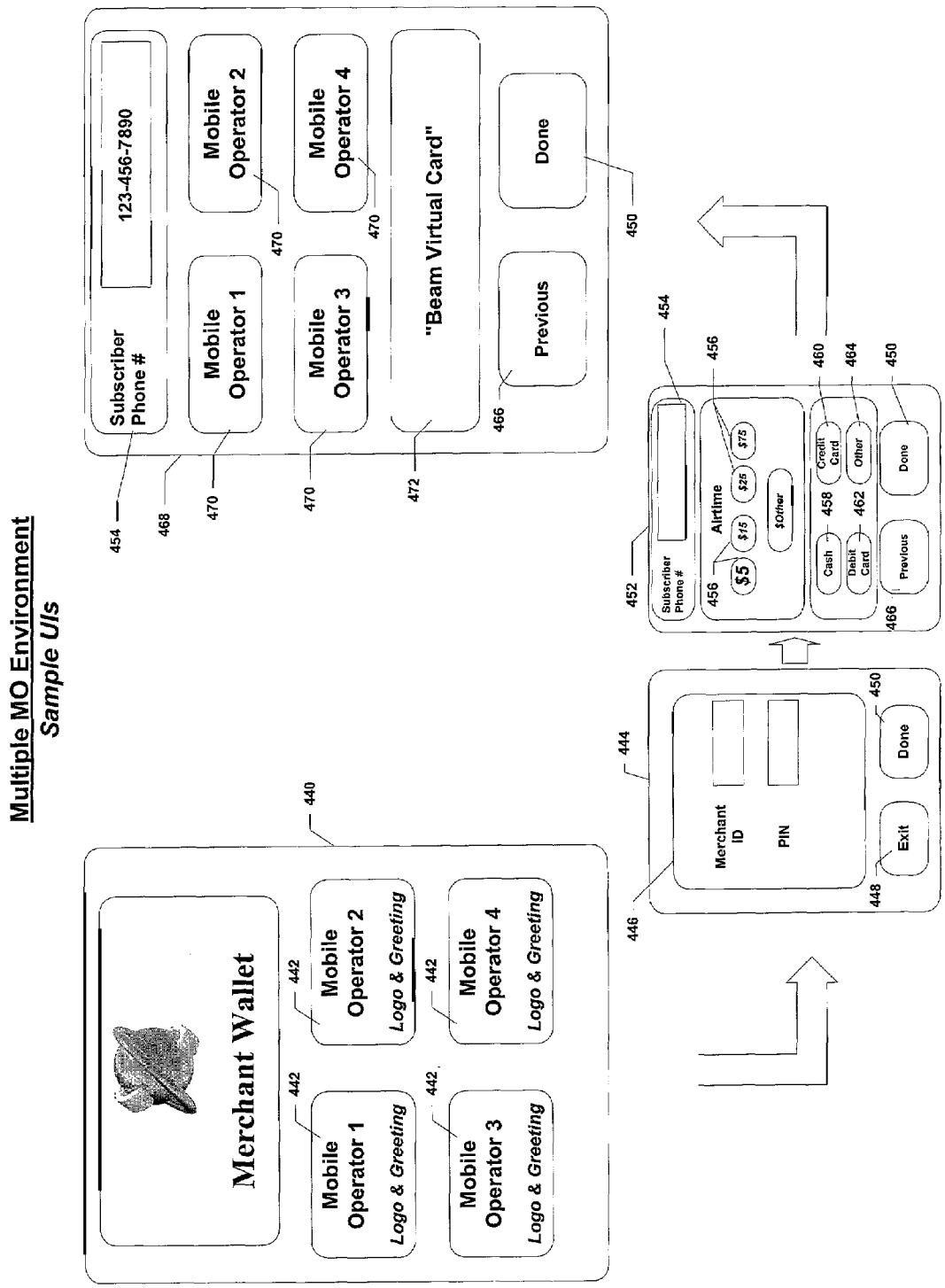
FIG. 22 is a diagram of examples of user interfaces for a multiple MO environment of the present invention.

FIG. 22 illustrates examples of user interface screens for the Merchant ETD 104 in a Multiple MO environment. In a first screen 440, icons for a plurality of MO's 442 are displayed. In a second screen 444, a form for entering Merchant Identification and PIN 446 is displayed, along with icons for Exit 448 and Done 450. IN a third screen 452, a form for entry of the MO Subscriber telephone number 454 is displayed. Also displayed are icons for selecting an amount of value paid 456, and icons for form of payment, e.g., Cash 458, Credit Card 460, Debit Card 462, or Other 464. Additional displayed icons include Previous 466, and Done 450. In a fourth screen 468, icons for selecting between MO's 470 are displayed. Also, an icon for transferring the virtual card 472 is displayed.

Figure 23:
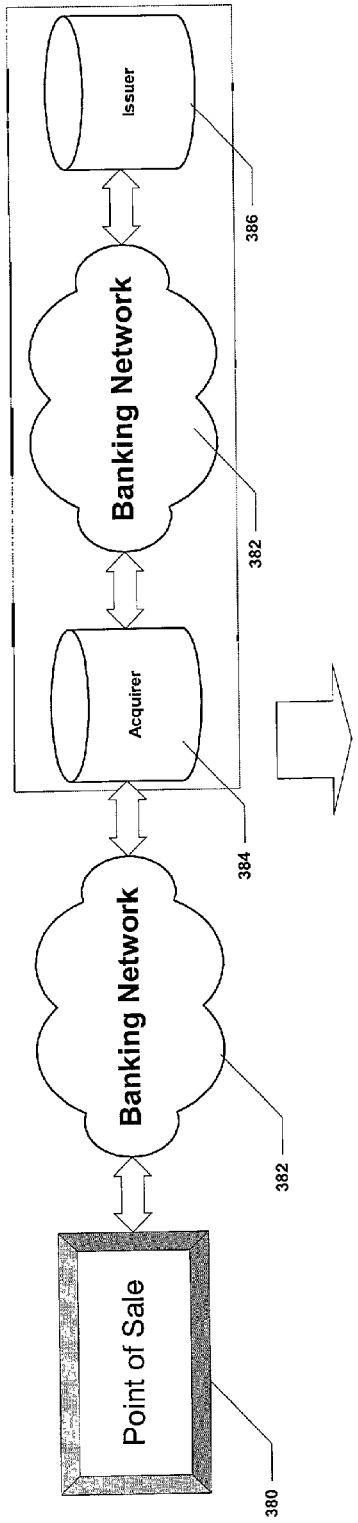
FIG. 23 is a diagram of an Existing Transaction System and a Wireless Transaction System.
Figure 23:
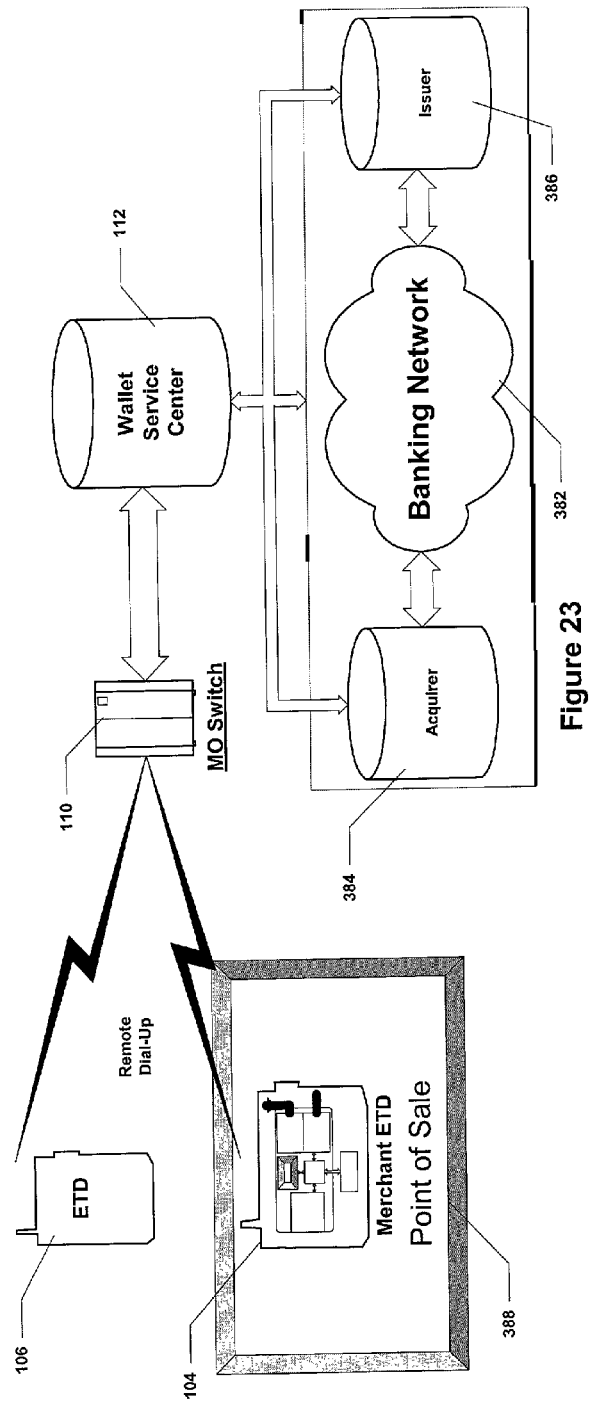

FIG. 23 describes an existing transaction system and a wireless transaction system. One of the purposes of this patent is to introduce a new transaction system, which includes the Merchant ETD at the POS (and possibly the ETD, in certain embodiments), along with the Wallet Service Center. The existing transaction system typically consists of a POS 380, or retail environment. This is connected, through a secure banking network 382 to the acquirers 384 and eventually back to the issuer 386 of the payment product—Credit Cards, Bank Cards, Debit Cards, etc. The acquirers 384 and issuers 386 may possibly be controlled by the same organization, or may be different entities bound by an arrangement to clear transactions—American Express and DISCOVER are examples of the first kind, MasterCard and VISA are examples of the later. The new wireless transaction system consists of a Merchant ETD at a wireless POS 388, wirelessly connected to the Mobile Operator's switch 110, which in turn is connected to the Wallet Service Center 112. The Wallet Service Center may be connected either to the acquirer or directly to the issuer, or possibly both, based on the acquirer—issuer relationship. The nature of the connection between the Mobile Operator's switch, the Wallet Service Center, and the acquirer—issuer's systems may be a wired or wireless connection. The ETD, Merchant ETD and Wallet Service Center ensure the security of the transaction data as it wirelessly flows from the POS location, through the Mobile Operator's switch, eventually to the acquirer—issuer's systems.

Based on the nature of the electronic transaction device application transaction, whereby the payment information (credit card details, account number, etc.) is stored and transmitted from the mobile handset, only after being initiated by the user (user enters unique password, which along with a unique handset device number—SIM, WIM, etc.—is translated into a unique key, or treated as a "digital signature" to validate the transaction)—the transaction is of a "Card Holder Present" nature. The electronic transaction device application allows the subscriber to use a credit card to setup and top-up their pre-paid account, and at the same time allows the mobile operator to pick up the savings of the reduced credit card issuer fee for a "CHP" transaction.

Using the electronic transaction device application User Interface, the subscriber now has a simple menu driven, graphical, user friendly procedure of selecting the amount of airtime required, and the payment vendor and account (credit, debit, etc.) to be used. The electronic transaction device application on the mobile handset will also allow the subscriber to store the receipt of the transaction, show the updated airtime and payment account balances. Thus the mobile operator may now use the electronic transaction device application on mobile handsets, along with its automated system, to allow their pre-paid subscribers to setup & top-up their accounts using their handsets. This removes the requirement of a customer service representative to have a dedicated session with the subscriber, and also offers a lot less cumbersome alternative to the automated setup and top-up methods.

The Merchant ETD 104 may be used for distributing pre-paid airtime, either using the MO's network and existing mobile handsets, and later on by issuing "virtual pre-paid cards." The Merchant ETD 104 may be used in a retail environment or at the certified distribution centers—bank locations, ATMs, or over the counter locations. The Merchant ETD 104 supports cash, credit card, debit card, etc. transactions. The Merchant ETD 104 allows the mobile operator to immediately reduce all costs associated with the generation, packaging and distribution of physical plastic cards. The Merchant ETD 104 also allows the mobile operator to remotely issue and track the distribution of their pre-paid products, removing all costs associated with the physical tracking of inventory. This model also gives the mobile operator the flexibility to enhance the services and products, and at the same time rapidly deliver these new offerings to their subscribers.

The same set of advantages applies to the merchants in the retail and virtual (e & m-tailers) environments. The mobile operator may use the Merchant ETD 104 to distribute pre-paid "Virtual Cards", thereby immediately reducing all costs associated with the generation, packaging and distribution of plastic. Since the Merchant ETD 104 eliminates the requirement of shelf space, and also removes the element of "physical inventory management" on the retailers part, the mobile operator is essentially in a position to negotiate reduction in retailer margins.

The Merchant ETD 104 may also be used to enhance or upgrade the current offering of products and services, and rapidly and remotely deliver these to their subscribers, with minimal costs associated. Add to these savings, the savings associated with the card holder present transaction, when the electronic transaction device application is used by the subscriber, and subsequently reduction in cash handling costs, etc.

In conjunction with the electronic transaction device application and Merchant ETD 104 products, the Wallet Service Center (hereby incorporated by reference) also allows the mobile operator to create a trail of otherwise untraceable "cash" transactions/subscribers. This is beneficial in terms of allowing the mobile operator to better understand their subscribers and cater additional products and services to them. This also, in light of law enforcement requirements by government agencies, allows the mobile operator and law enforcement agencies to track unlawful use of pre-paid phones.

In summary, present invention is that it allows MO's to extract more value, and hence immediate profitability, from their existing distribution models—be it in terms of eliminating cost of producing and distributing plastic, or the high commission paid to the retailers, or the CHP nature of all credit card transactions. The present invention allows the mobile operator to create alternate distribution channels, giving them the ability to modify each existing mobile handset into a potential point of sale terminal.

The electronic transaction device application gives the mobile operator the presence on the subscriber's handset, the Merchant ETD 104 gives them the ability to distribute products and services in a retail environment, essentially taking the mobile operator beyond the m-commerce space. The WSC gives the mobile operator the ability to continuously keep adding on value added services for their subscribers, merchants and vendors. Thus, the mobile operator now has the ability to create a trace of their subscribers, including the subscribers that typically pay cash and leave no personal information behind. The WSC creates a profile for each subscriber, whether they use cash or credit cards, or debit cards, etc. to pay for the pre-paid airtime. This is also helpful for the law enforcement agencies to curb the misuse of pre-paid phones for unlawful activities. In addition, the WSC allows the mobile operator to efficiently track the airtime top-up for all their subscribers, independent of who the subscriber is or how they purchased their pre-paid airtime. The WSC creates a better and more efficient management system between the mobile operators and various distributors they use in the retail and non-retail environment.

The WSC, along with the electronic transaction device application and Merchant ETD 104, creates the optimum platform for the mobile operator to offer various value added services and products to their subscribers, merchants and services. The stored value application is an example of how the mobile operator may use the same infrastructure installed to electronically distribute pre-paid airtime, to allow their subscribers to buy products and services from the merchants equipped with a Merchant ETD.

The new wireless transaction system introduced, which includes the ETD, Merchant ETD and Wallet Service Center, would now make the entire transaction more secure and profitable. In one embodiment, the ETD securely and wirelessly transmits the payment information from the user to the Merchant ETD, or directly to the WSC. In another embodiment the Merchant ETD directly relays the transaction data to the WSC. Both these configurations reduce the element of fraud at the POS, where now the user of the ETD, or the merchant using the Merchant ETD are authenticated. The transaction data is also securely transmitted from the user to the POS to the acquirer—issuer's system, with less intermediaries, reducing the potential of fraud. The new system also reduces the cost of a transaction by reducing the intermediaries, thereby allowing the acquirer—issuers to channel the cost savings back to the user.

What is claimed is:

1. A method of distributing virtual pre-paid cards comprising:
    a) creating a plurality of virtual pre-paid cards, each virtual pre-paid card comprising a digital representation of information corresponding to information stored on a physical card;
    b) downloading batches of virtual pre-paid cards to a retailer electronic transaction device,
    c) transferring one of the plurality of virtual pre-paid cards from the retailer electronic transaction device to a MO Subscriber Handset.

2. The method of claim 1, wherein the digital representation of information corresponding to information stored on a physical card comprises an authorization code.

3. The method of claim 1, wherein the digital representation of information corresponding to information stored on a physical card comprises an image of a card.

4. The method of claim 1, wherein the digital representation of information corresponding to information stored on a physical card comprises value information, said value information comprising a quantity of minutes corresponding to a pre-paid telephone account.

5. The method of claim 1, further comprising the step of transferring payment information from the MO subscriber handset to the retailer electronic transaction device.

6. The method of claim 1, wherein the payment information comprises cash payment information.

7. The method of claim 6, wherein the cash payment information includes an identification of a person providing a cash payment.

8. The method of claim 5, wherein the payment information comprises credit payment information.

9. The method of claim 1, wherein the step of creating the plurality of virtual cards is performed by an electronic transaction device service center.

10. The method of claim 9, further comprising the steps of:
    a) transferring payment information and subscriber information from the MO subscriber handset to the retailer electronic transaction device; and
    b) transferring the payment information and subscriber information from the retailer electronic transaction device to the electronic transaction device service center.

11. The method of claim 9, wherein the step of downloading the virtual card to a retailer electronic transaction device occurs via a MO switch.

12. The method of claim 1, wherein the virtual card further comprises logo and branding information.

\* \* \* \* \*